(12) United States Patent
Obata

(10) Patent No.: US 9,317,936 B2
(45) Date of Patent: Apr. 19, 2016

(54) INFORMATION TERMINAL AND DISPLAY CONTROLLING METHOD

(71) Applicant: Kyocera Corporation, Kyoto-shi, Kyoto (JP)

(72) Inventor: Takanori Obata, Higashiosaka (JP)

(73) Assignee: Kyocera Corporation, Kyoto-shi (JP)

( * ) Notice: Subject to any disclaimer, the term of this patent is extended or adjusted under 35 U.S.C. 154(b) by 56 days.

(21) Appl. No.: 13/867,703

(22) Filed: Apr. 22, 2013

(65) Prior Publication Data

US 2013/0278625 A1   Oct. 24, 2013

(30) Foreign Application Priority Data

Apr. 23, 2012   (JP) ................. 2012-097287

(51) Int. Cl.
*G06T 11/00* (2006.01)
*G06F 3/01* (2006.01)
*G06F 3/023* (2006.01)

(52) U.S. Cl.
CPC .............. *G06T 11/00* (2013.01); *G06F 3/013* (2013.01); *G06F 3/0236* (2013.01); *G06F 3/0237* (2013.01)

(58) Field of Classification Search
CPC ......... G06F 3/013; G06F 3/005; G06F 3/011; G06F 3/017; G06F 1/163
See application file for complete search history.

(56) References Cited

U.S. PATENT DOCUMENTS

| | | | | |
|---|---|---|---|---|
| 7,429,108 B2* | 9/2008 | Rosenberg | ............. | G06F 3/013 351/209 |
| 8,576,175 B2* | 11/2013 | Singh et al. | ................. | 345/169 |
| 2002/0180799 A1* | 12/2002 | Peck | ..................... | G06F 3/0485 715/784 |
| 2003/0038754 A1* | 2/2003 | Goldstein | ............... | G06F 3/013 345/7 |
| 2005/0047629 A1* | 3/2005 | Farrell | ..................... | G06F 3/013 382/117 |
| 2006/0256083 A1* | 11/2006 | Rosenberg | ............. | G06F 3/013 345/156 |
| 2009/0125849 A1* | 5/2009 | Bouvin et al. | ................. | 715/863 |
| 2009/0315827 A1* | 12/2009 | Elvesj et al. | .................. | 345/157 |
| 2010/0066691 A1* | 3/2010 | Li | .................. | 345/173 |
| 2010/0182232 A1* | 7/2010 | Zamoyski | ...................... | 345/157 |
| 2010/0207877 A1* | 8/2010 | Woodard | ....................... | 345/156 |
| 2011/0083078 A1* | 4/2011 | Ju | ................................. | 715/738 |

(Continued)

FOREIGN PATENT DOCUMENTS

| | | |
|---|---|---|
| JP | 2005-182603 A | 7/2005 |
| JP | 2007-141059 A | 6/2007 |

(Continued)

OTHER PUBLICATIONS

Thomas et al., Putting Gaze into Context: A Framework for Analyzing Gaze Behavior in Interactive and Dynamic Environments; © 2010; ACM; 8 pages.*

(Continued)

*Primary Examiner* — Linh K Pham
(74) *Attorney, Agent, or Firm* — Procopio Cory Hargreaves and Savitch LLP

(57) ABSTRACT

A mobile phone is capable of displaying data of a website stored in a server through a browsing function. The mobile phone is also capable of detecting a line-of-sight of a user with utilizing an infrared light. In a case where the user is reading a website, a keyword is acquired from a content of the website based on the line-of-sight of the user. Thereafter, if a search result screen on a search site is displayed, a plurality of index information are listed such that the index information of the website related to an acquired keyword becomes a higher rank.

13 Claims, 13 Drawing Sheets

(56) References Cited

U.S. PATENT DOCUMENTS

| | | | |
|---|---|---|---|
| 2011/0087961 A1* | 4/2011 | Fitusi et al. | 715/261 |
| 2012/0032817 A1* | 2/2012 | Cleveland | 340/971 |
| 2012/0059647 A1* | 3/2012 | Hammoud | 704/9 |
| 2012/0083312 A1* | 4/2012 | Kim | 455/556.1 |
| 2012/0130828 A1* | 5/2012 | Cooley et al. | 705/14.71 |
| 2014/0009395 A1* | 1/2014 | Ku et al. | 345/157 |

FOREIGN PATENT DOCUMENTS

| | | |
|---|---|---|
| JP | 2008-287517 A | 11/2008 |
| JP | 2009-086744 A | 4/2009 |
| JP | 2009-169541 A | 7/2009 |

OTHER PUBLICATIONS

Forget et al., Input Precision for Gaze-Based Graphical Passwords; © 2010; ACM; 6 pages.*

Manu Kumar; Gaze-Enhanced User Interface Design; © May 2007; Manu Kumar; 164 Pages.*

Zhang et al., Effect of Different Visual Feedback Forms on Eye Cursors Stabilities. © Springer-Verlag Berlin Heidelberg 2011; 10 pages.*

Office action dated Jun. 16, 2015 issued in counterpart Japanese Application No. 2012-097287.

Umemoto, Kazutoshi and other three (3) persons, Estimation of user's intention utilizing eye-gaze information, The 3rd forum on data engineering and information management, proceedings [online], Japan, The Institute of Electronics, Information and Communication Engineers, Committee specialized in data engineering, Jul. 27, 2011.

Office Action dated Sep. 1, 2015, issued in counterpart Japanese application No. 2012-097287.

Kondo et al., "Personalized Query Recommendation Using HITS-Based Wikipedia Ranking Algorithm and User History" Data Engineering Workshop, Japan, The Institute of Electronics, Information and Communication Egineers, Commitee specialized in data enfineering, Apr. 7, 2008; pp. 1-7.

Office Action dated Feb. 2, 2016, issued in counterpart Korean/Japanese application No. 2012-097287.

* cited by examiner (A)    (B)

KEYWORD TABLE

| TIME | KEYWORD | NUMBER OF GAZE TIMES | GAZE TIME PERIOD | WEIGHING VALUE |
|---|---|---|---|---|
| 2012/3/25 15:36:15 | KEYWORD1 | TWO (2) | 1.0 SECOND | 32 |
| 2012/3/25 15:36:20 | KEYWORD2 | TWO (2) | 0.4 SECONDS | 20 |
| ⋮ | ⋮ | ⋮ | ⋮ | ⋮ |

INFORMATION TERMINAL AND DISPLAY CONTROLLING METHOD

CROSS REFERENCE OF RELATED APPLICATION

The disclosure of Japanese Patent Application No. 2012-97287 is incorporated herein by reference.

BACKGROUND OF THE INVENTION

1. Field of the Invention

The present invention relates to an information terminal and a display controlling method, and more specifically, an information terminal having a display portion and a display controlling method thereof.

2. Description of the Related Art

An example of an information terminal having a display portion is disclosed in Japanese Patent Application Laying-Open No. 2005-182603 [G06F 17/30, G06F 3/00, G06F 3/14] laid-open on Jul. 7, 2005. An information processing apparatus of this related art has a display, a line-of-sight information measuring portion which measures a line-of-sight when the line-of-sight is directed to the display, etc. When a user reads any web site by utilizing a data search service connected via Internet, reading time information at that time is produced. Then, in a case where the past reading information is displayed, the reading information is sequentially displayed in an order of data having a longer reading time.

However, in the information processing apparatus of the related art, it is possible to efficiently search the past reading information, but it is impossible to efficiently information intended to be newly searched.

SUMMARY OF THE INVENTION

Therefore, it is a primary object of the present invention to provide a novel information terminal and display controlling method.

Another object of the present invention is to provide an information terminal and display controlling method, capable of performing an efficient search.

A first aspect according to the present invention is an information terminal having a display portion displaying a text, and capable of reading any data from a database, comprising: a line-of-sight detecting module operable to detect a line-of-sight with respect to the display portion; an acquiring module operable to acquire a keyword from the text being displayed on the display portion based on a line-of-sight detected by the line-of-sight detecting module; and a displaying processing module operable to cause the display portion to display a plurality of data in a listing order that is set based on the keyword when the plurality of data are read from the database.

A second aspect according to the present invention is a display controlling method in an information terminal having a display portion displaying a text and a line-of-sight detecting module operable to detect a line-of-sight with respect to the display portion, wherein the information terminal is capable of reading any data from a database, comprising steps of: acquiring a keyword from the text being displayed on the display portion based on a line-of-sight detected by the line-of-sight detecting module; and displaying on the display portion a plurality of data in a listing order that is set based on the keyword when the plurality of data are read from the database.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows situation that an infrared light irradiated to a face of the user is imaged by the infrared camera, and FIG. 3(B) shows a gaze point of the user.

FIG. 4(A) shows a state that a top page of a search site is displayed, and FIG. 4(B) shows a state that a search result is displayed.

FIG. 6(A) shows a state that a gazing range is set, and FIG. 6(B) shows a line-of-sight locus based on the gaze point.

FIG. 10(A) shows another state that a top page of a search site is displayed, and FIG. 10(B) shows an example of a predicted conversion candidate corresponding to an input character.

DETAILED DESCRIPTION OF THE PREFERRED EMBODIMENTS

Figure 1:
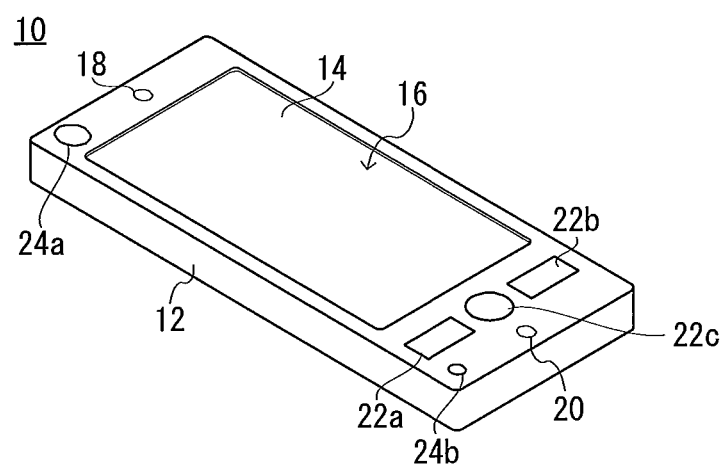
FIG. 1 is an appearance view showing a mobile phone of an embodiment according to the present invention.

In FIG. 1, a smart phone having a longitudinal flat rectangular housing 12 is shown as a mobile phone of an embodiment according to the present invention. It is pointed in advance that the present invention can be applied to an arbitrary information terminal such as a tablet terminal, a PDA, etc.

A display 14 of a liquid crystal, organic EL or the like, which functions as a display portion, is provided on a main surface (front surface) of the housing 12 included in the mobile phone shown in FIG. 1. A touch panel 16 is provided on the display 14. Therefore, in the mobile phone 10 of this embodiment, the most part of an input operation excepting an input by an operation of a hardware key described later is performed through the touch panel 16.

A speaker 18 is housed in the housing 12 at one end of a longitudinal direction on a side of the main surface, and a microphone 20 is housed at the other end in the longitudinal direction on the side of the front surface. As a hard key constituting an input operating module together with the touch panel 16, a call key 22a, an end key 22b and a menu key 22c are provided.

An infrared camera 24a is provided at a left side of the speaker 18, and an infrared LED 24b is provided at a left side of the microphone 20. The infrared camera 24a and the infrared LED 24b are provided such that an imaging surface of the infrared camera 24a and an light-emitting surface of the infrared LED 24b can be exposed from the housing 12 but the other portions of the infrared camera 24a and the infrared LED 24b are housed within the housing 12.

For example, the user can input a telephone number by making a touch operation on the touch panel 16 with respect to a dial key (not shown) displayed on the display 14, and start a telephone conversation by operating the call key 22a. If and when the end key 22b is operated, the telephone conversation can be ended. In addition, by long-depressing the end key 22b, it is possible to turn-on/-off power of the mobile phone 10.

If the menu key 22c is operated by the user, a menu screen is displayed on the display 14, and in such a state, by making a touch operation on the touch panel 16 with respect to a soft key, a menu icon (both, not shown) or the like being displayed on the display 14, it is possible to select a menu and to determine such a selection.

Figure 2:
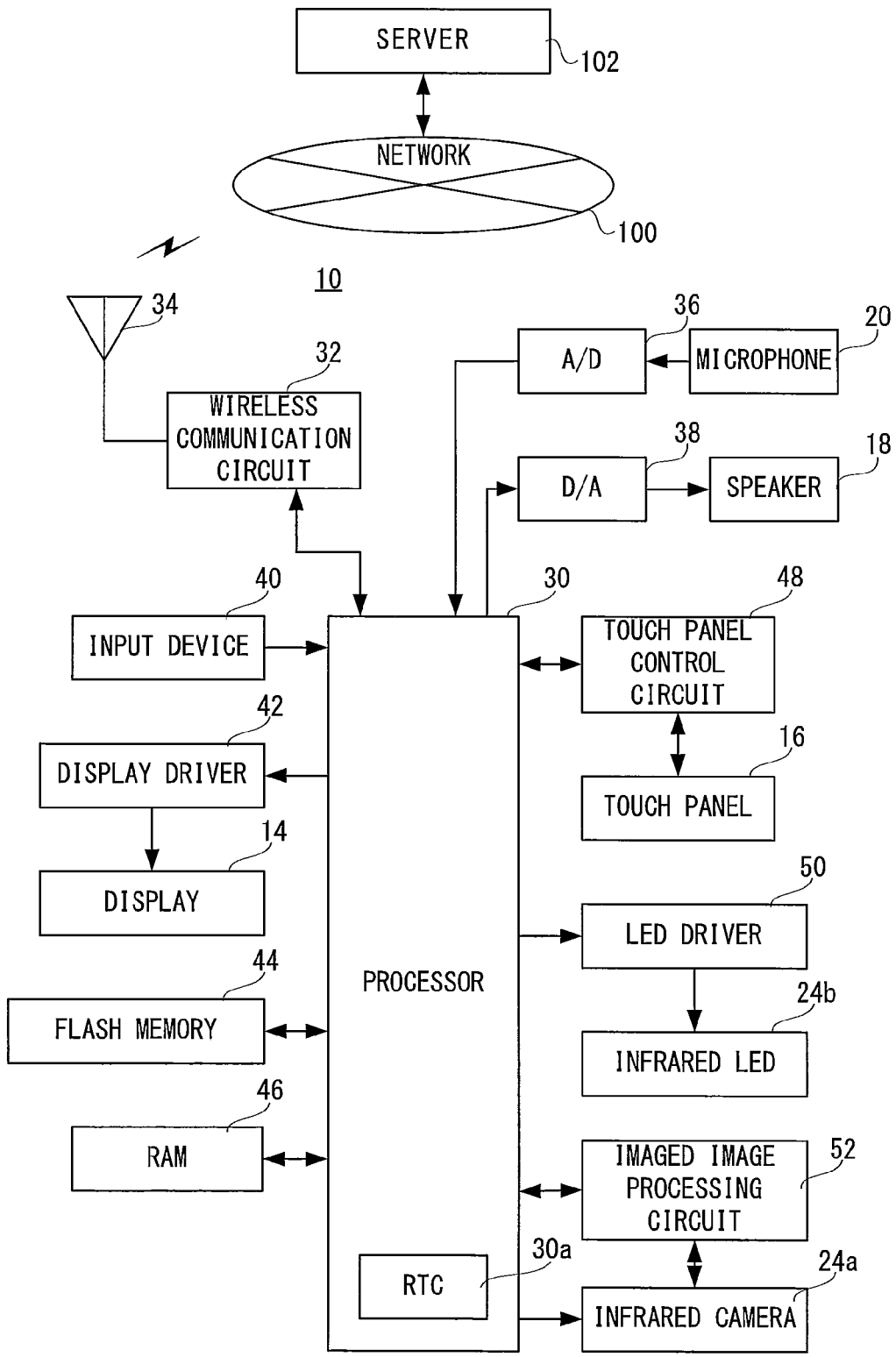
FIG. 2 is a view showing an example of electrical structure of the mobile phone shown in FIG. 1.

With referring to FIG. 2, the mobile phone 10 of the embodiment shown in FIG. 1 includes a processor 30 called as a computer or a CPU. The processor 30 is connected with the infrared camera 24a, a wireless communication circuit 32, an A/D converter 36, a D/A converter 38, an input device 40, a display driver 42, a flash memory 44, a RAM 46, a touch panel control circuit 48, an LED driver 50, an imaged image processing circuit 52, etc.

The processor 30 is in charge of a whole control of the mobile phone 10. An RTC 30a is incorporated within the processor 30, by which a time (including year, month, day) is counted. All or a part of a program set in advance in the flash memory 44 is, in use, developed or loaded into the RAM 46, and the processor 30 operates in accordance with the program in the RAM 46. At this time, the RAM 46 is further used as a working area or buffer area for the processor 30.

The input device 40 includes the hard keys 22 (a-c) shown in FIG. 1, and constitutes an operating module or an inputting module together with the touch panel 16 and the touch pane control circuit 48. Information (key data) of the hard key user operates is input to the processor 30. Hereinafter, an operation by the hard key is called as "key operation".

The wireless communication circuit 32 is a circuit for transmitting and receiving a radio wave for a telephone conversation, a mail, etc. via an antenna 34. In this embodiment, the wireless communication circuit 32 is a circuit for performing a wireless communication with a CDMA system. For example, if the user designates an outgoing call (telephone call) using the input device 40, the wireless communication circuit 32 performs a telephone call processing under instructions from the processor 30 and outputs a telephone call signal via the antenna 34. The telephone call signal is transmitted to a telephone at the other end of the line through a base station and a communication network. Then, when an incoming call processing is performed in the telephone at the other end of the line, a communication-capable state is established and the processor 30 performs the telephonic communication processing.

Specifically describing a normal telephonic communication process, a modulated voice signal sent from a telephone at the other end of the line is received by the antenna 34. The modulated voice signal received is subjected to demodulation processing and decode processing by the wireless communication circuit 32. A received voice signal obtained through such processing is converted into a voice signal by the D/A converter 38 to be output from the speaker 18. On the other hand, a sending voice signal taken-in through the microphone 20 is converted into voice data by the A/D converter 36 to be applied to the processor 30. The voice data is subjected to encode processing and modulation processing by the wireless communication circuit 32 under instructions by the processor 30 to be output via the antenna 34. Therefore, the modulated voice signal is transmitted to the telephone at the other end of the line.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, the processor 30 outputs from the speaker 18 a ringer-tone (may be also called as a ringer-tone melody, a ringer-tone voice).

Then, if the user performs an answering operation by using the call key 22a included in the input device 40, the wireless communication circuit 32 performs the telephone incoming processing under instructions by the processor 30. Furthermore, a communication-capable state is established, and the processor 30 performs the above-described telephone conversation processing.

If the telephone communication ending operation is performed by the end key 22b (FIG. 1) included in the input device 40 after a state is changed to the communication-capable state, the processor 30 transmits a telephone communication ending signal to the telephone at the other end of the line by controlling the wireless communication circuit 32. Then, after the transmission of the telephone communication ending signal, the processor 30 terminates the telephone conversation processing. Furthermore, in a case that the telephone communication ending signal from the telephone at the other end of the line is received before the telephone conversation ending operation at this end, the processor 30 also terminates the telephone conversation processing. In addition, in a case that the telephone conversation ending signal is received from the mobile communication network not from the telephone at the other end of the line, the processor 30 also terminates the telephone conversation processing. The wireless communication circuit 32 is wirelessly connected to the network 100 (communication network, telephone network) via the antenna 34. The network 100 is connected with a server 102 with a cable or wirelessly. In addition, although a detailed description will be made later, the server 102 is stored with data of various websites and so on. The server 102 is further stored with a database constructed with index information.

The microphone 20 shown in FIG. 1 is connected to the A/D converter 36, and as described above, a voice signal from the microphone 20 is input to the processor 30 as digital voice data through the A/D converter 36. The speaker 18 is connected to the D/A converter 38. The D/A converter 38 converts digital voice data into a voice signal so as to apply to the speaker 18 via an amplifier. Therefore, a voice by the voice data is output from the speaker 18.

In addition, the processor 30 adjusts, in response to an operation for adjusting a volume by the user, a voice volume of the voice output from the speaker 18 by controlling an amplification factor of the amplifier connected to the D/A converter 38.

The display driver 42 is connected to the display 14 and the processor 30 to store image data output from the processor 30 into a VRAM of the display driver 42. The display driver 42 displays on the display 14 an image corresponding to the data in the VRAM. In other words, the display driver 42 controls a displaying by the display 14 which is connected to the display driver 42 under instructions by the processor 30. In addition, the display 14 is provided with a backlight which includes a light source of an LED or the like, for example, and the display driver 42 controls, according to the instructions from the processor 30, brightness, light-on/-off of the backlight.

A touch panel control circuit 48 is connected with the touch panel 16 shown in FIG. 1. The touch panel control circuit 48 inputs to the processor 30 an on/off of an operation of the touch panel 16, a touch start signal indicating a start of a touch by the user to the touch panel 16, a touch end signal indicating an end of a touch by the user, and coordinates data (touch coordinates data) indicating a touch position that the user touches. The processor 30 can determine which icon or key is touched by the user based on the coordinates data input from the touch pane control circuit 48. The operation on the touch panel 16 is hereinafter called as "touch operation".

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers are brought into contact with the touch panel 16, for example. Specifically, the touch panel control circuit 48 detects a touch operation within a touch-effective range of the touch panel 16, and outputs coordinates data indicative of a position of the touch operation to the processor 30.

In addition, because the touch panel 16 is provided on the display 14 and capable of designating an arbitrary position within the screen, there is an occasion that touch panel 16 is called as "pointing device". Furthermore, for the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a touch pen or other predetermined inputting devices.

An LED driver 50 is connected with the infrared LED 24b shown in FIG. 1. The LED driver 50 switches on/off (lighting/ lighting-out) of the infrared LED 24b under instructions by the processor 30.

An imaged image processing circuit 52 is connected with the infrared camera 24a shown in FIG. 1. The imaged image processing circuit 52 applies image processing to imaged image data from the infrared camera 24a to input monochrome image data to the processor 30. The infrared camera 24a performs imaging processing under instructions by the processor 30 to input imaged image data to the imaged image processing circuit 52. The infrared camera 24a is constructed by a color camera using an imaging device such as a CCD, CMOS and an infrared filter. Therefore, it is possible to acquire a color image if such structure that the infrared filter is attachable and detachable is adopted and the infrared filter is detached.

In addition, the above-described wireless communication circuit 32, A/D converter 36 and D/A converter 38 may be included in the processor 30.

In the mobile telephone 10 having such structure, instead of a key operation or a touch operation, it is possible to perform an input or operation by a line-of-sight (hereinafter, may be called as "eye-controlled operation"). In the following, examples of eye-controlled operation will be described. Although a detecting method of a gaze area based on the eye-controlled operation will be described later in detail, by the eye-controlled operation, predetermined processing that is set in correspondence to a predetermined region (hereinafter, may be called as "operating region") designated by a point (a gaze point EP) that a line-of-sight and a displaying plane of the display 14 are intersected with each other is performed.

As the predetermined processing, predetermined information is input, a predetermined action (operation) is performed, or a predetermined application is activated, for example. A button image or a displaying region of a reduced image such as an icon or thumbnail capable of being designated or turned-on by the eye-controlled operation comes under the operating region; however, there is an occasion that only an operating region is set in an area where no such image is displayed. Furthermore, in this embodiment shown, an area including a gaze point ("divided area" described later) is determined as a gaze area, and it is determined that an operating region overlapped with the gaze area or included in the gaze area is designated by the eye-controlled operation. Therefore, a position where a reduced image such as a button image, icon or thumbnail designated or turned-on by the eye-controlled operation is displayed and a size thereof, and a position and a size of an operating region that is set without relationship with such an image are determined by taking the divided area into account. For example, it is configured not to display a plurality of reduced images in the same divided area, or not to set a plurality of operating area in the same divided area.

Next, a detecting method of a gaze area by a line-of-sight of this embodiment will be described with referring to FIG. 3(A). The infrared camera 24a and the infrared LED 24b are arranged with an interval of a certain distance in a longitudinal direction of the mobile phone 10. For example, the infrared camera 24a and the infrared LED 24b are arranged in such a manner that a center of an imaging surface of the infrared camera 24a and a center of a light-emitting surface of the infrared LED 24b are aligned on a straight line. The infrared camera 24a is arranged above the display 14 and the infrared LED 24b is arranged below the display 14. By arranging in such a manner, an infrared light is irradiated onto a lower portion below a center of an eyelid of the user, and therefore, even if the user slightly closes the eyelid, a reflected light of the infrared light can be surely imaged.

In addition, the distance between the infrared camera 24a and the infrared LED 24b is decided in accordance with a distance between the face of the user and the mobile phone 10 (a surface of the housing or a displaying surface of the display 14) at a time that the user uses the mobile phone 10, a size of the mobile phone 10, etc.

In a case where a gaze area is to be detected, a pupil and a reflected light of the infrared light are detected by the processor 30 from an image imaged by the infrared camera 24*a*. A method for detecting the pupil and the reflected light of the infrared light from the imaged image has been well-known, and not essential for this embodiment, and therefore, a description thereof will be omitted here.

Figure 3:
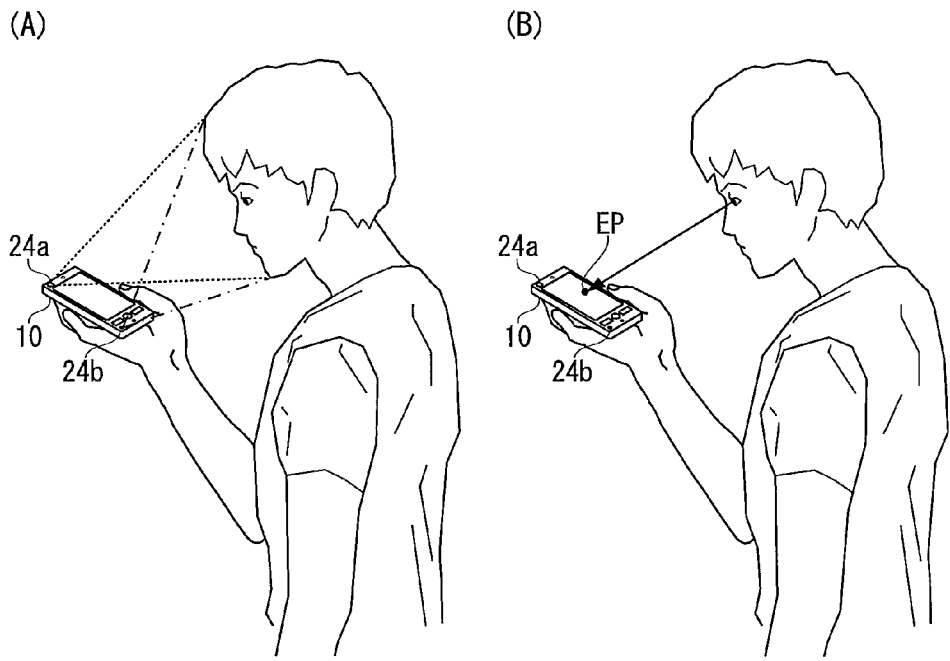
FIG. 3 is a view showing an example of situation that a line-of-sight of a user is detected with utilizing an infrared camera and an infrared LED shown in FIG. 1.

With referring to FIG. 3(B), if the processor 30 detects the pupil and the reflected light from the imaged image, the processor 30 then detects a direction of a line-of-sight (a line-of-sight vector). More specifically, a vector from a position of the reflected light toward a position of the pupil in a two-dimensional image imaged by the infrared camera 24*a* is detected. A vector directed to a center of the pupil from a center of the reflected light is the line-of-sight vector. Then, in this embodiment, a gaze point EP is evaluated based on the line-of-sight vector, and thus, a gaze area is decided.

In addition, the infrared camera 24*a* and the infrared LED 24*b* are called as a line-of-sight detecting module because the same are utilized for detecting a line-of-sight.

Figure 4:
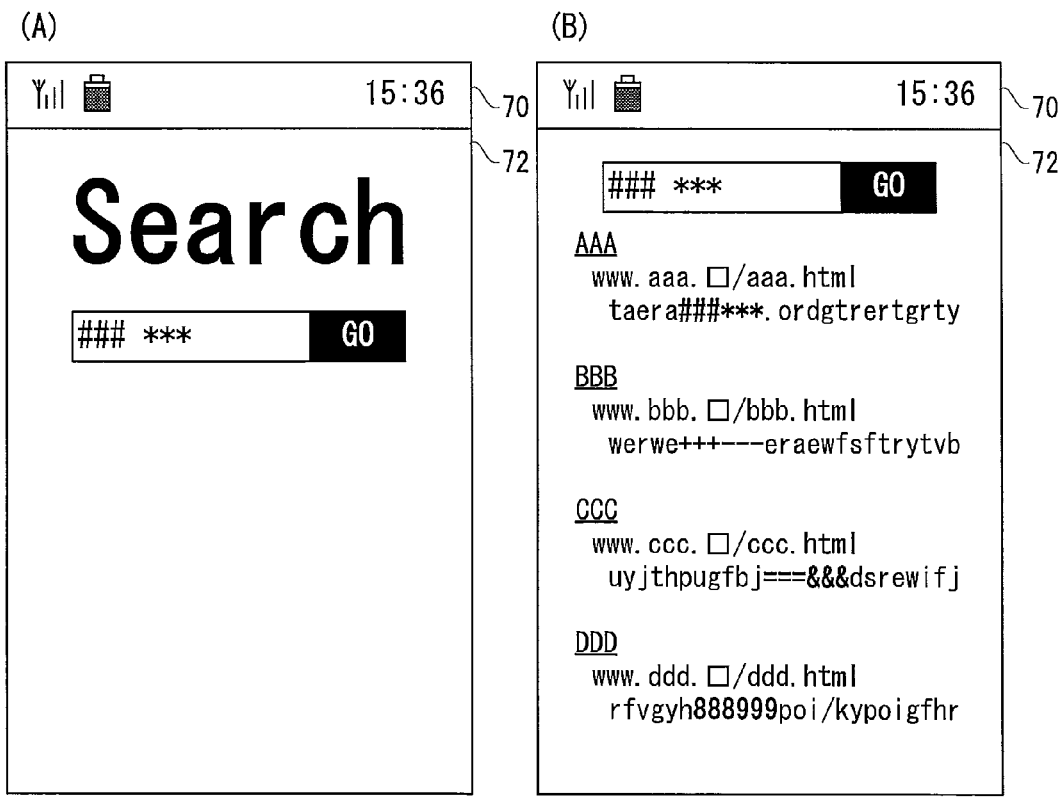
FIG. 4 is a view showing an example of situation that a screen for a browsing function is displayed on a display shown in FIG. 1.

FIGS. 4(A) and 4(B) are examples of displaying on the display 14 at a time that a browsing function is performed. With referring to FIG. 4(A), the display 14 includes a status displaying area 70 and a function displaying area 72. In the status displaying area 70, an icon (picto) indicative of a radio-wave reception state by the antenna 34, an icon indicative of a residual battery capacity of a secondary battery and day and time are displayed. Then, in the function displaying area 72, a screen of a website is displayed. Here, a top page of a search site for searching other websites is being displayed on the display 14.

If an operation to start a search after a search word is input as "###*" in a search site, for example, as shown in FIG. 4(B), a search result is displayed on the display 14. In a screen of the search result, the search word and index information read from the server 102** based on the search word are displayed. The index information is information produced in advance for efficiently searching a website. Then, in the index information of this embodiment, a link, URL, content, etc. are included, and in the search result, the index information including these items is displayed.

In the index information of the search result, the link ("AAA", for example) indicates a title of the website. In addition, if an operation for selecting the link is performed, the screen is shifted to a website corresponding to the link. The URL indicates a position that data of the website corresponding to the link is saved within the network 100. The content indicates content (character string) of the website corresponding to the link, and includes a character string related to the search word.

In FIG. 4(B), the index information of the websites of "AAA", "BBB", "CCC" and "DDD" are displayed as the search result. In addition, although not displayed on the display 14, index information such as "EEE" and "FFF", etc. are read from the server 102 with respect to the search word "###***". Then, the index information not being displayed becomes to be displayed when an operation for scrolling the screen is performed.

In addition, a listing order of these index information is decided by a processor of the server 102 based on the number of times that a target website is read and/or a degree of relation to the search word. Therefore, the index information is displayed normally in accordance with a listing order decided in advance.

Figure 5:
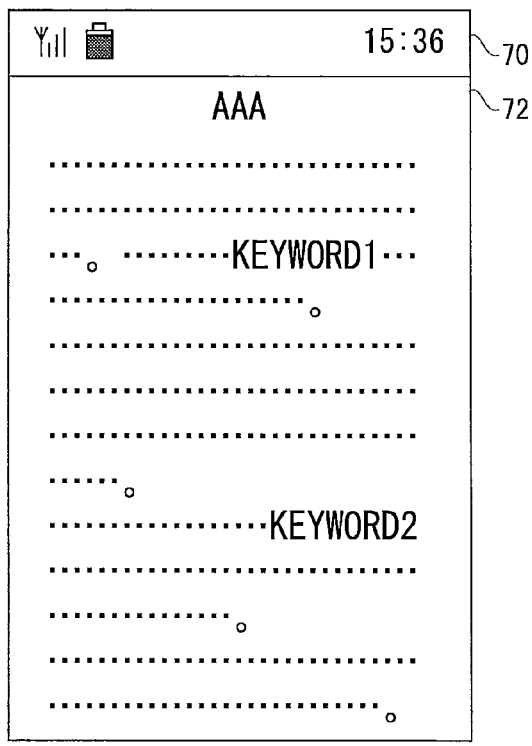
FIG. 5 is a view showing an example of a state that a website is displayed on the display shown in FIG. 1.

With referring to FIG. 5, if the link of "AAA" is selected, a part of the top page of the website of "AAA" is displayed. In a state shown in FIG. 5, the search word is not displayed. In addition, not utilized as the search word, in this screen, character strings of "KEYWORD 1" and "KEYWORD 2" are included. A description of these character strings will be made later, and therefore, omitted here.

In addition, if it is necessary to return to the screen of the search result from the top page of the website of "AAA", the user may operate the end key 22*b* to which a "return" function is assigned.

There is an occasion that if the user intends to search target information, the index information of a website including the target information is not listed in a higher rank. In such a case, if an adequate search word is re-input, the index information of a necessary website may be listed in a higher rank; however, the user do not always think of an adequate search word, and accordingly, the user must read a plurality of websites not needed, and thus, an efficiency of the search decreases.

Therefore, in this embodiment shown, by utilizing a line-of-sight of the user detected, a keyword that the user gazes is acquired from a text being displayed on the display 14, and by utilizing the keyword, a displaying order or listing order of the index information is re-arranged. By such processing, the efficiency of the information search by the user is increased. In the following, an acquisition of a keyword and a re-arrangement of the search result with utilizing the keyword will be described.

Figure 6:
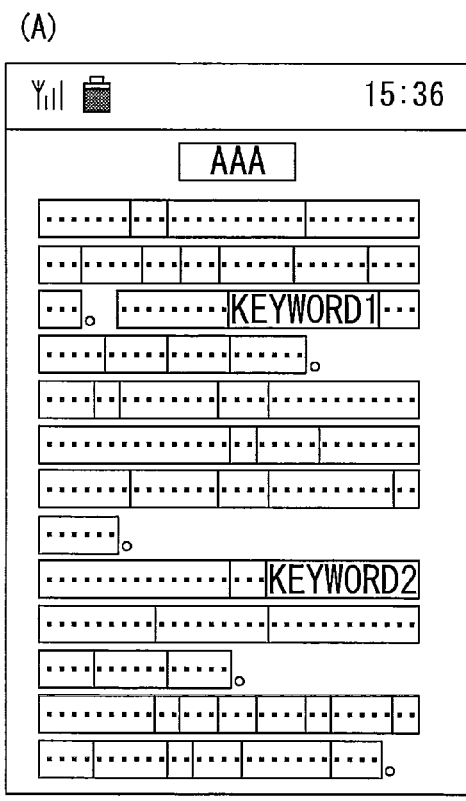
FIG. 6 is a view showing an example of procedure for acquiring a keyword from the website shown in FIG. 5.
Figure 6:
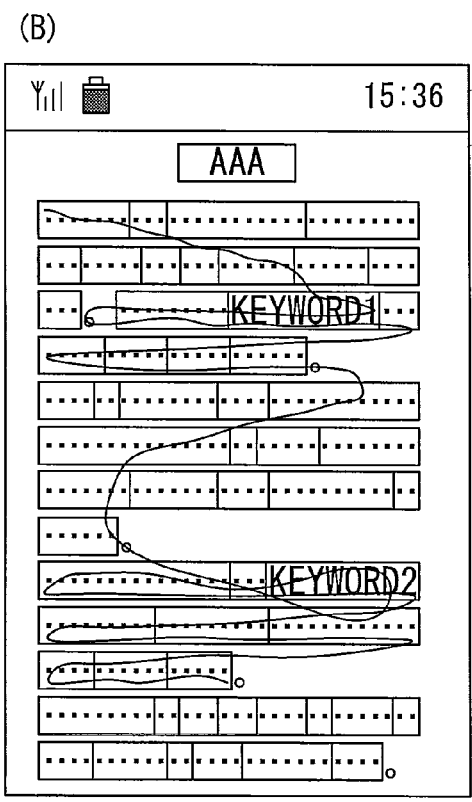

With referring to FIG. 6(A), if a website of "AAA" is shifted from the screen of the search result, a text (character string) being displayed in the page is divided into a word, and a gaze range is set for each divided word. Although not shown, if an image is being displayed, a displaying range of the image is wholly made as a gaze range. In addition, in other embodiments, the text may be divided into a kind of character not into a word.

Next, with referring to FIG. 6(B), the line-of-sight of the user is detected, and then, a locus that the gaze point EP moves (hereinafter, called as "line-of-sight locus") is recorded. If and when the gaze point EP is included within the gaze range for more than a predetermined time period (0.5 seconds, for example), a character string included in the gaze range is acquired as a keyword. In FIG. 6(B), in gaze ranges of "KEYWORD 1" and "KEYWORD 2", a stay time period of the gaze point EP is more than the predetermined time period, and therefore, these character strings are acquired as keywords.

Next, if an operation returning to the search screen is input, with respect to the acquired keyword, the number of gaze times and a gaze time period are evaluated based on the line-of-sight locus.

The number of gaze times is counted at a time that the predetermined time period elapses since the gaze point EP enters the gaze range. In a case of "KEYWORD 1", for example, the gaze point EP enters the gaze range twice, and the stay time period of the gaze point EP is more than the predetermined time period, respectively, and accordingly, the number of gaze times becomes "two times". In a case of "KEYWORD 2", the gaze point EP enters the gaze range three times, but the stay time period of the first gaze point EP does not reach the predetermined time period, and accordingly, the number of gaze times is "two times".

As for the gaze time period, when the stay time period of the gaze point EP in the gaze range is for more than the predetermined time period, the stay time period exceeding the predetermined time period is counted as the gaze time period. In a case where the stay time period of the gaze point EP is "0.7 seconds", for example, "0.2 seconds" becomes the gaze time period by subtracting the predetermined time period from the stay time period.

Figures 7, 8:
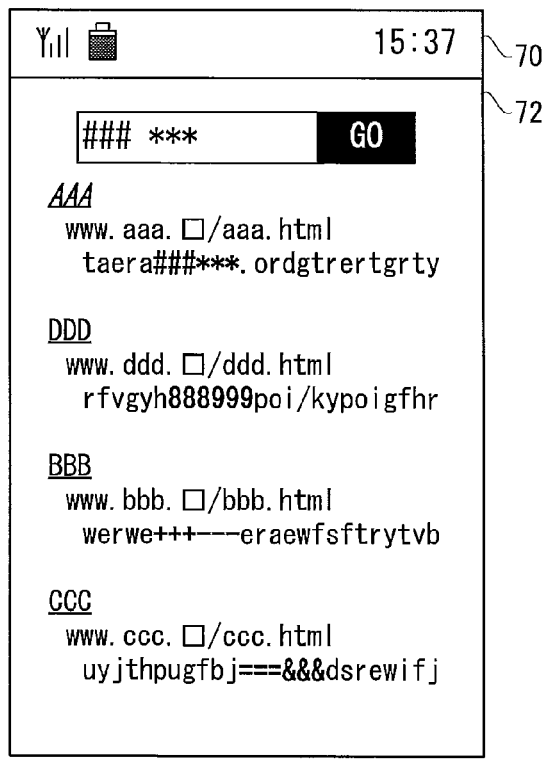
FIG. 7 is a view showing an example of structure of a keyword table stored in a RAM shown in FIG. 1.
FIG. 8 is a view showing another example of a search result displayed on the display shown in FIG. 1.

The number of gaze times and the gaze time period of the keyword thus evaluated are recorded in a keyword table shown in FIG. 7 together with a time that the keyword is acquired. For example, "two times" as the number of gaze times and "1.0 second" as the gaze time period are recorded in correspondence to "KEYWORD 1" and "two times" as the number of gaze times and "0.4 seconds" as the gaze time period are recorded in correspondence to "KEYWORD 2".

Then, in the keyword table, a weighing value of a keyword calculated based on the number of gaze times and the gaze time period is further recorded. The weighing value is a value which numerically represents a height of the user's interest to the keyword. In a case where a plurality of keywords exist, a listing order of the search result is set based on weighing values of the plurality of keywords. In this embodiment, the weighing value is calculated based on a following equation 1.

Weighing value=$a$×(the number of gaze times)+$b$× (gaze time period)      [Equation 1]

where: a, b: weighing coefficients

In a case where "a=6" and "b=20", for example, a weighing value for "KEYWORD 1" is calculated as "32", and a weighing value for "KEYWORD 2" is calculated as "20". Thus, based on the number of times and the time that the keyword is gazed, a height of interest of the user for the keyword can be calculated as a weighing value.

If the weighing value is set to the keyword, and the displaying of the display 14 is returned to the search screen, a listing order of the index information a content of each of which has not been confirmed is set, and the index information are displayed in the set listing order. However, a displaying order of the website ("AAA") having been read is not changed.

In the website of "DDD", for example, "KEYWORD 1" and "KEYWORD 2" are both included, and in the website of "BBB", "KEYWORD 1" is included, and in the website of "CCC", "KEYWORD 2" is included. In such a case, a listing order of the index information is set as shown in FIG. 8.

More specifically, the website of "AAA" has already been read, the listing order of the index information of "AAA" is not changed.

Next, since the website which includes both of "KEYWORD 1" and "KEYWORD 2" is only "DDD", the index information of "DDD" is listed at a second order. Since the weighing value of "KEYWORD 1" is heavier than that of "KEYWORD 2", the index information of "BBB" including "KEYWORD 1" is listed at an order higher than that of the index information of "CCC". Therefore, in the screen of the search result shown in FIG. 8, the index information are listed in an order of "AAA", "DDD", "BBB" and "CCC".

Thus, it is possible to re-arrange the index information by utilizing a keyword in which the user is interested. Therefore, it becomes possible to efficiently find the index information of the website in which target information of the user is included.

Especially, even if the number of the keywords is two or more, by calculating a weighing value of each keyword, a listing order of a plurality of index information can be adequately set.

Furthermore, since the information of the server 102 is utilized, it is possible for the user to search necessary information from a database having a large amount of information.

The weighing value of the keyword become small at every time that a predetermined time period elapses from a timing that the keyword is registered. Specifically, at every time that the predetermined time period elapses, a following equation 2 is applied to the weighing value.

Weighing value=original weighing value×$c^{\wedge}$(current time−recording time)      [Equation 2]

where, c: a weighing coefficient, and ^ is a symbol indicative of factorial

When the original weighing value is "32.0", the weighing coefficient c is "0.9999", and a time difference between the current time and the recording time is "one hour and a half (1.5)", for example, if re-calculated according to the equation 2, the weighing value becomes "31.9936".

Then, the weighing value becomes equal to or less than a threshold value (1.0, for example), a keyword corresponding to the weighing value is deleted. Accordingly, it is possible to delete a keyword that the user loses his/her interest as time elapses.

Furthermore, in a case where the gaze point EP is included for more than a predetermined time period within the gaze range including an image, in the keyword table, a fixed phrase ("image", for example) is registered. Because no text is included in the gaze range, a fixed phrase is acquired as a keyword.

In a case where "image" is registered as the keyword, that is, in a case where it is considered that the user is interested in the image, a listing order of a plurality of index information is set such that the index information of a website including an image is displayed at a higher rank. Thus, it is possible to set a listing order that the index information of the website including the image becomes a higher rank if and when the user gazes at the image. In addition, when the user gazes at a moving image not a still image, a fixed phrase such as "moving image" or the like can be acquired.

Figure 9:
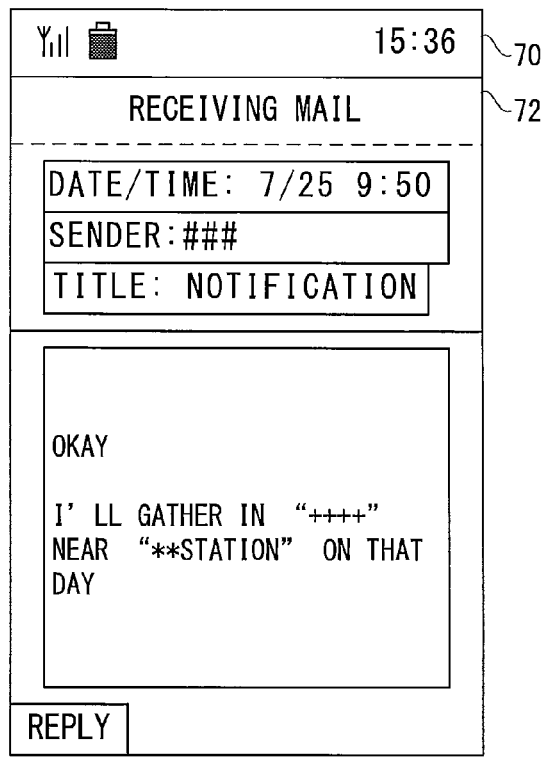
FIG. 9 is a view showing an example of a receiving mail displayed on the display shown in FIG. 1.

Next, other situations that a keyword is acquired will be described. With referring to FIG. 9, in this embodiment, even if the receiving mail is being displayed, a keyword is acquired based on to line-of-sight of the user. For example, in FIG. 9, " station" and "++++" written in a mail body are acquired as a keyword. In addition, a weighing value of " station" is larger than a weighing value of "++++".

Subsequently, another search result that a listing order is set with utilizing a keyword will be described. With referring to FIG. 10(A), if a top page of a search site is displayed at a time that "** station" and "++++" are acquired as keywords, a predicted search word related to the keyword is displayed in the top page. More specifically, a predicted search word including a keyword out of a plurality of predicted search words produced in advance in the server 102 is read from the server 102 to be displayed in the top page of the search site, whereby the keyword can be utilized at a time that the search is started, and accordingly, convenience for the user who searches information increases.

In addition, a listing order of " station" and "++++" is set based on the weighing values thereof. Furthermore, although " station" and "++++" are displayed as the predicted search words in FIG. 10(A), in addition thereto, "** station timetable", "++++map" or the like may be displayed as a predicted search word.

Figure 10:
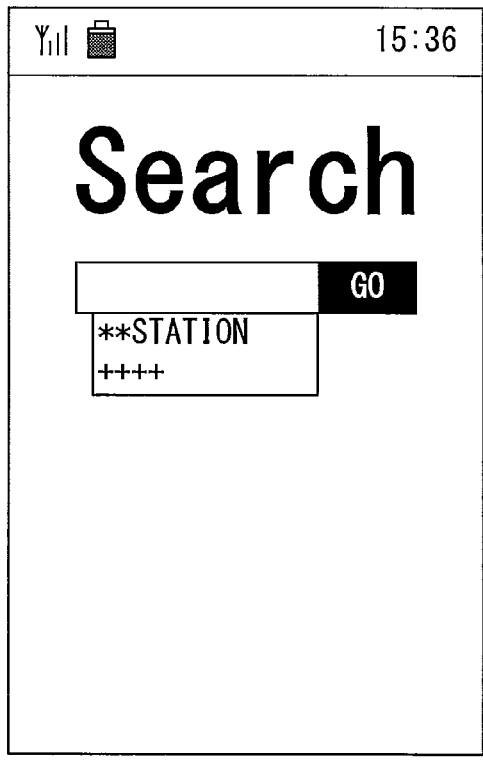
FIG. 10 is a view showing an example of a predicted search word or predicted conversion candidate corresponding to a keyword shown in FIG. 9.
Figure 10:
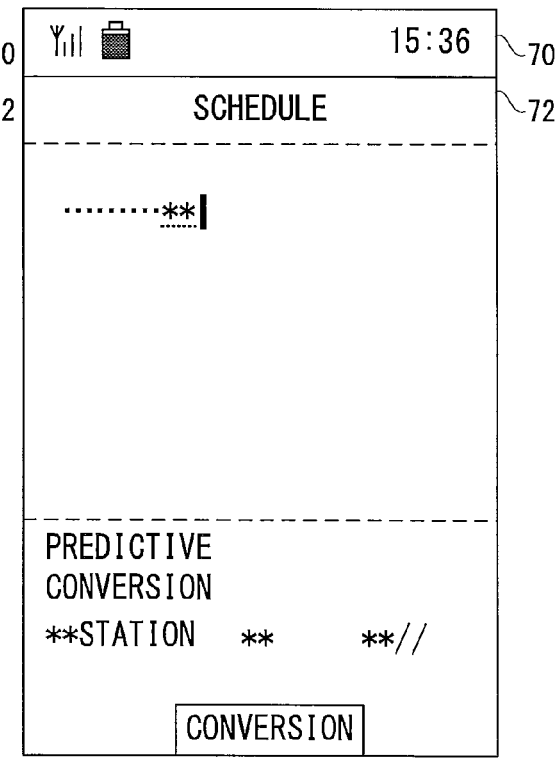

With referring to FIG. 10(B), in this embodiment, if an input character has not been settled in inputting a character, a predicted conversion candidate with respect to an unsettled character is displayed. If a part of a keyword is input as an unsettled character, a listing order of a plurality of predicted conversion candidates is set in such a manner that a predicted conversion candidate including a keyword becomes a higher rank. In a case where predicted conversion candidates to a character of "" are "", " station" and "//", a listing order of the predicated conversion candidates is set such that "** station" coincident with the keyword becomes a higher rank. Thus, since a predicted conversion candidate that it is considered that the user inputs can be displayed at a higher rank, the efficiency of the character input by the user increases. In addition, in other embodiments, a predicted conversion candidate may be displayed with no relation to character input.

Thus, in this embodiment shown, a keyword is acquired by utilizing a line-of-sight of the user, and data being displayed is re-arranged adequately by using the keyword, whereby the user can efficiently search the information.

Although a feature of the embodiment was outlined in the above, in the following, the feature of the embodiment will be described in detail with utilizing a memory map of the RAM 46 of the mobile phone 10 shown in FIG. 11, flowcharts showing an operation by the processor 30 of the mobile phone 10 shown in FIG. 12-FIG. 18.

Figure 11:
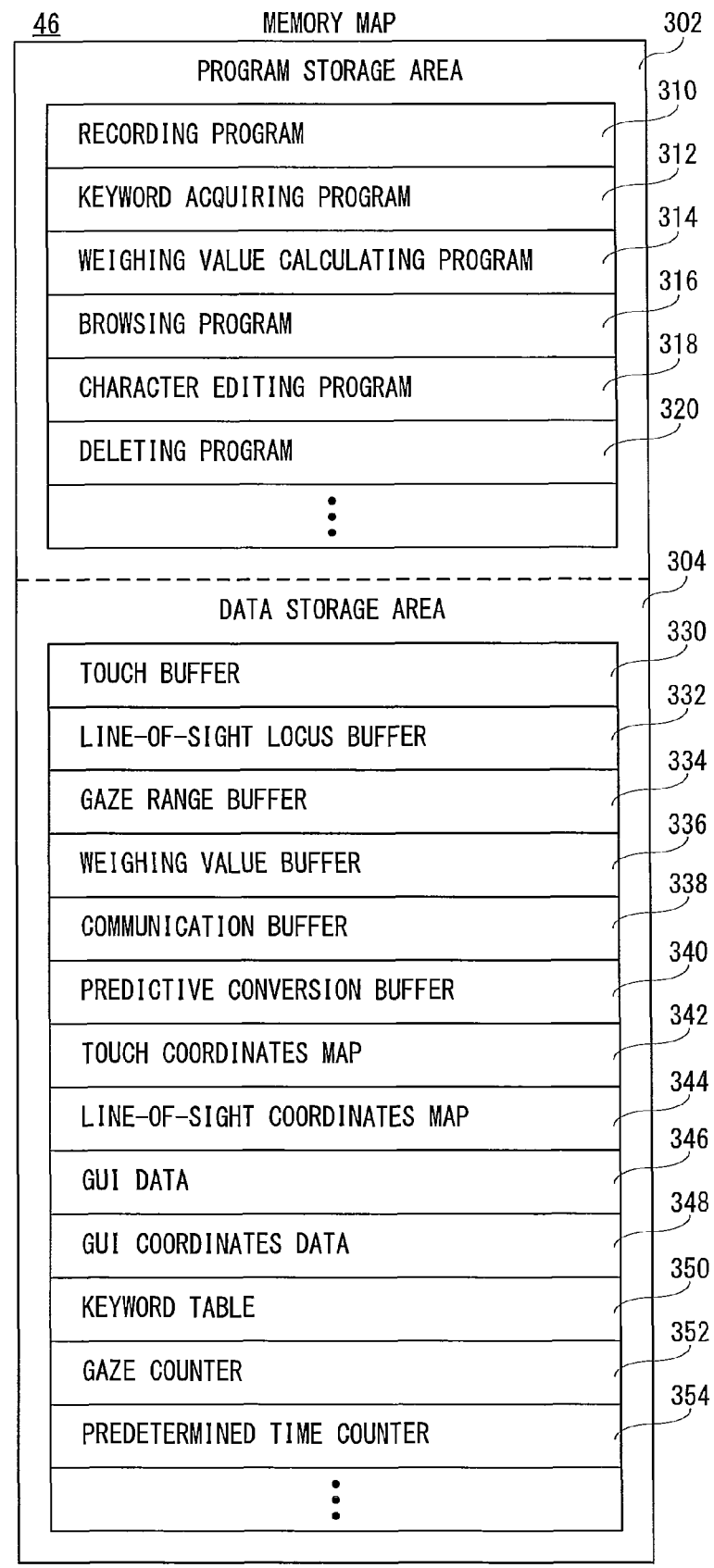
FIG. 11 is a view showing an example of a memory map of a RAM shown in FIG. 2.

With referring to FIG. 11, the RAM 46 shown in FIG. 2 is formed with a program storage area 302 and a data storage area 304. The program storage area 302 is for storing (developing) a part or a whole of the program data set in advance in the flash memory 44 (FIG. 2) as described above.

The program storage area 302 is stored with a recording program 310 for recording a line-of-sight locus, a keyword acquiring program 312 for acquiring a keyword, a weighing value setting program 314 for setting a weighing value to the keyword, a browsing program 316 for reading a website or the like, a character editing program 318 for producing a document, a deleting program 320 for deleting a keyword, etc.

In addition, the program storage area 302 is further stored with a program for detecting a line-of-sight, etc.

The data storage area 304 of the RAM 46 is provided with a touch buffer 330, a line-of-sight locus buffer 332, a gaze range buffer 334, a weighing value buffer 336, a communication buffer 338 and a predicting conversion buffer 340. Furthermore, the data storage area 304 is stored with a touch coordinates map 342, a line-of-sight coordinates map 344, GUI data 346, GUI coordinates data 348, a keyword table 350, etc., and further provided with a gaze counter 352, a predetermined time counter 354, etc.

In the touch buffer 330, data of a touch coordinates output by the touch panel control circuit 48 is stored. In the line-of-sight locus buffer 332, coordinates of the gaze point EP and a time at that time are stored at a predetermined interval (1/60 seconds, for example) in a state that the line-of-sight of the user is being detected. The gaze range buffer 334 temporarily stores coordinates indicating a divided gaze range. The weighing value buffer 336 is temporarily stored with a weighing value calculated based on the line-of-sight locus. The communication buffer 338 temporarily stores a predicted conversion candidate, index information, etc. obtained through a communication with the server 102. The predicted conversion buffer 340 temporarily stores a predicted conversion candidate read based on an input character.

The touch coordinates map 342 is data for mapping the touch coordinates in the touch operation and displaying coordinates of the display 14. The line-of-sight coordinates map 344 is data for mapping the line-of-sight coordinates (gaze point EP) in an eye-controlled operation and the displaying coordinates of the display 14. A result of a touch operation or the eye-controlled operation is reflected in the displaying of the display 14 based on the touch coordinates map 342 or the line-of-sight coordinates map 344.

The GUI data 346 includes image data and character string data for displaying a key, icon, etc. The GUI coordinates data 348 includes displaying coordinates data of the GUI being displayed. Therefore, if the touch operation is performed, based on the touch coordinates recorded in the touch buffer 330 and the GUI coordinates data 348, it is determined whether or not the touch operation is performed to the GUI of the key or the like. Furthermore, in a case where the eye-controlled operation is performed, based on the newest line-of-sight stored in the line-of-sight locus buffer 332 and the GUI coordinates data 348, it is determined whether or not the eye-controlled operation is performed against the GUI such as a key.

The keyword table 350 has structure shown in FIG. 7 in which an acquired keyword and a calculated weighing value and so on are recorded.

The gaze counter 352 is a counter for counting a time that the gaze point EP is included in the gaze range. Furthermore, the gaze counter 352 is initialized at a time that the gaze point EP enters the gaze range to start a count.

A predetermined time counter 354 is a counter for counting a predetermined time period, and therefore, this counter may be called as a predetermined time timer. The predetermined time counter 354 starts a count upon initialization.

In addition, the data storage area 304 is further stored with image data to be displayed in a standby state, character string data, etc., and provided with counters and flags necessary for an operation of the mobile phone 10.

Figure 12:
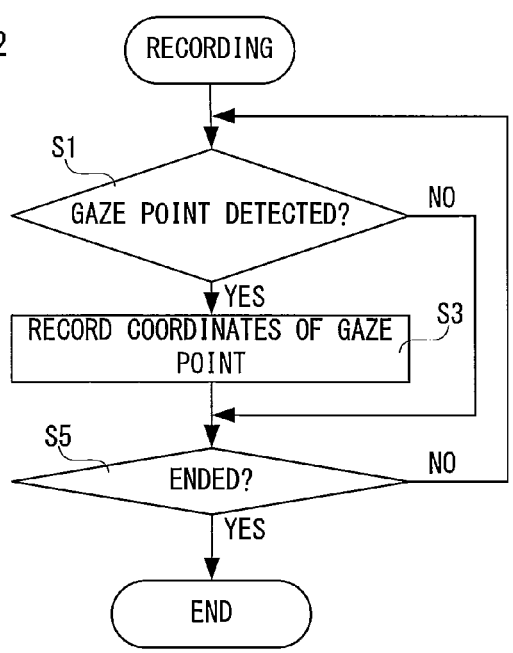
FIG. 12 is a flowchart showing an example of recording processing by a processor shown in FIG. 2.
Figure 14:
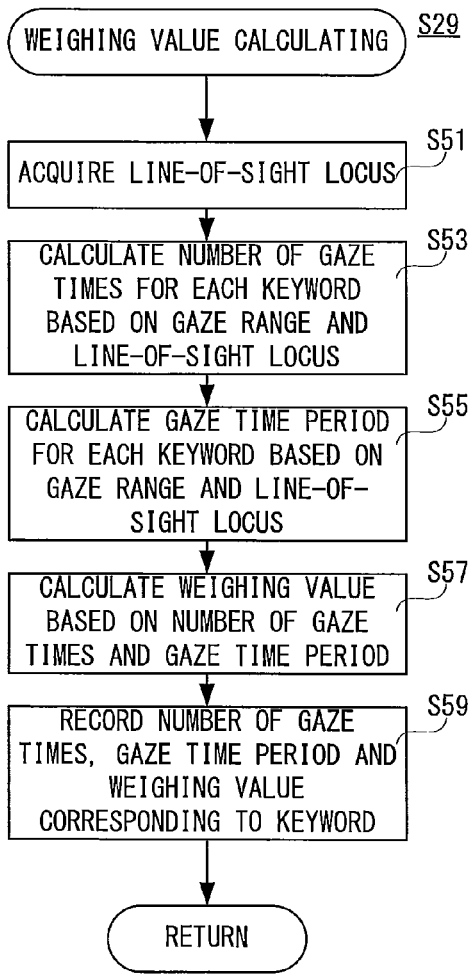
FIG. 14 is a flowchart showing an example of weighing value calculating processing by the processor shown in FIG. 2.
Figure 13:
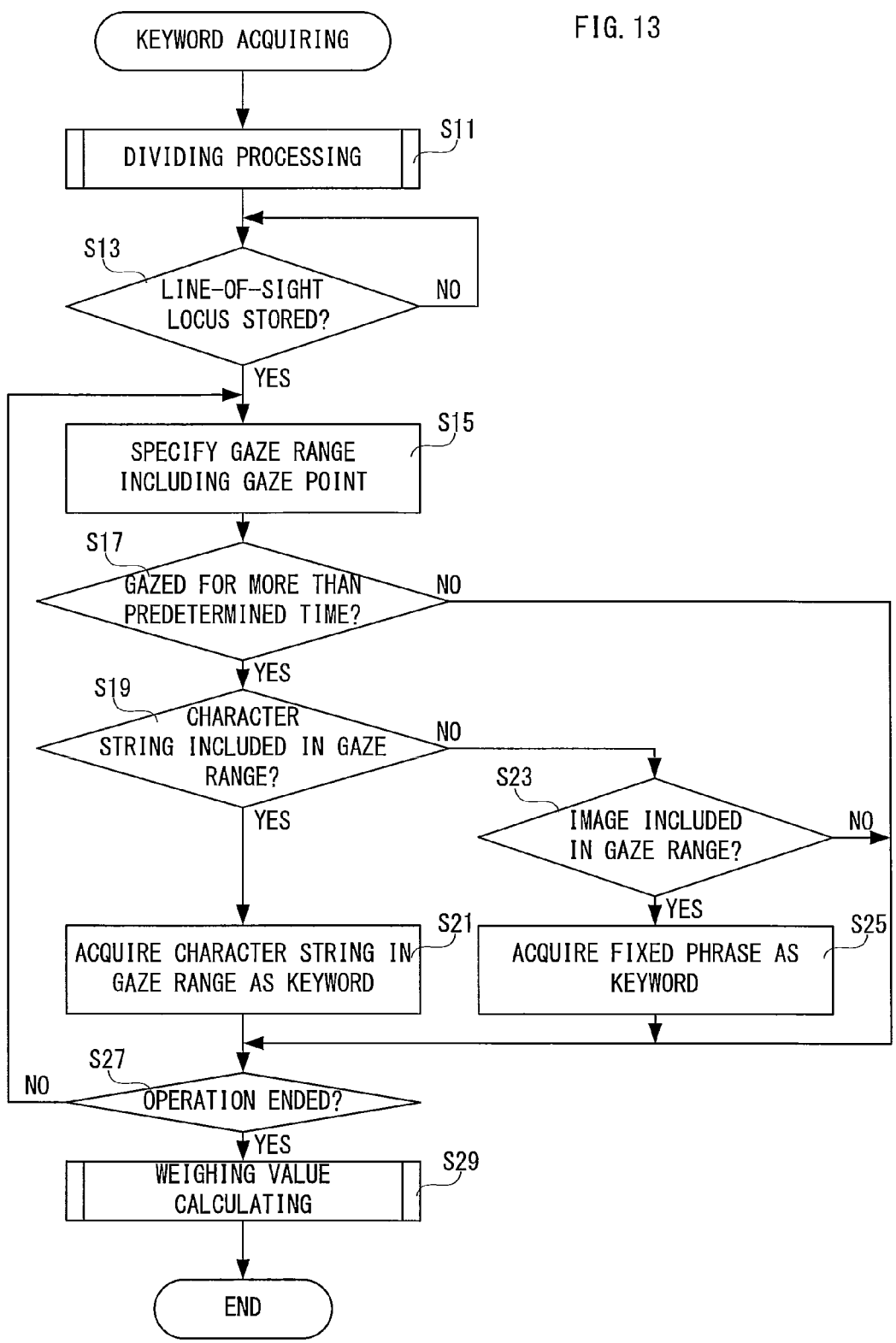
FIG. 13 is a flowchart showing keyword acquiring processing by the processor shown in FIG. 2.
Figure 15:
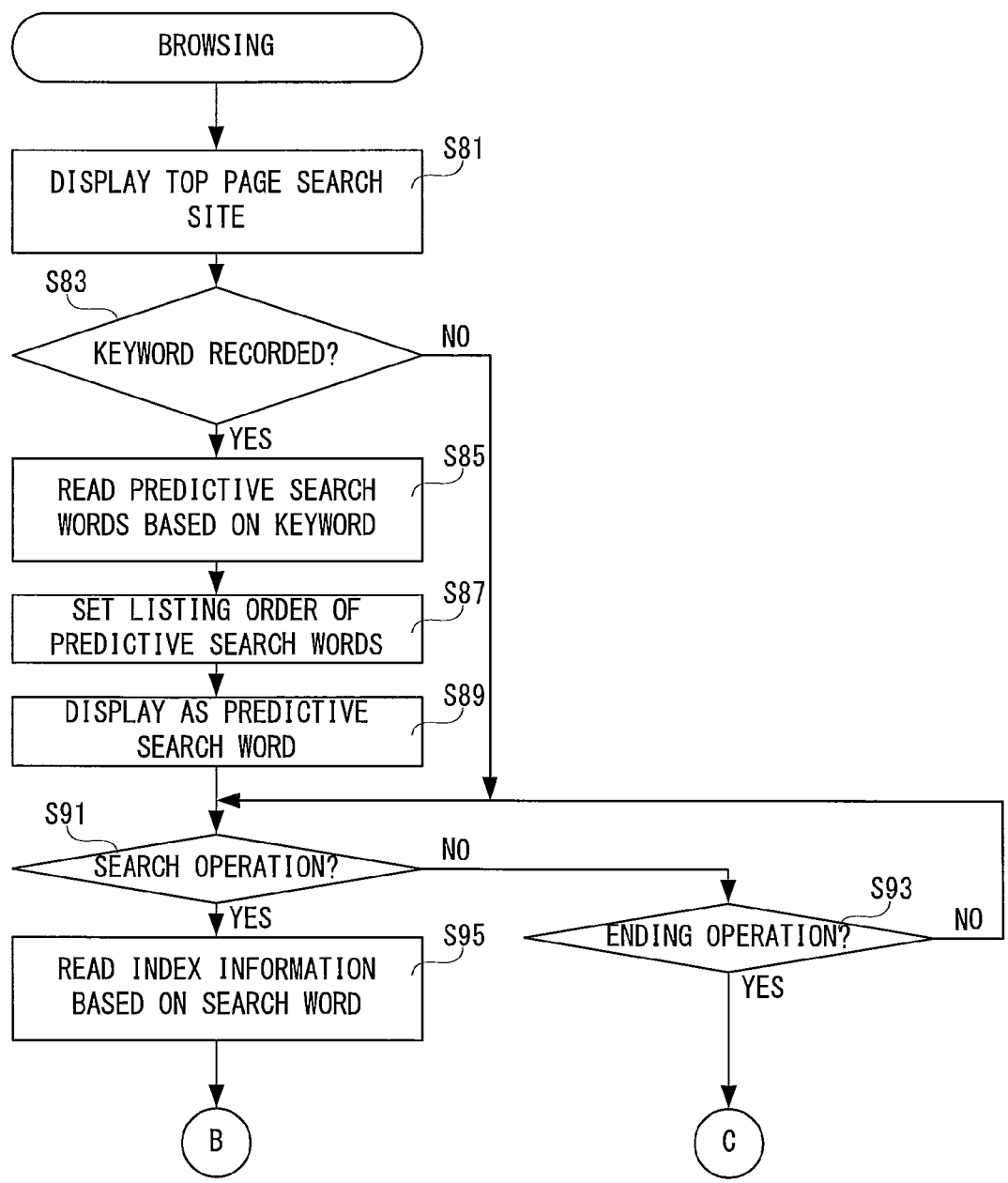
FIG. 15 is a flowchart showing an example of a part of browsing processing by the processor shown in FIG. 2.
Figure 16:
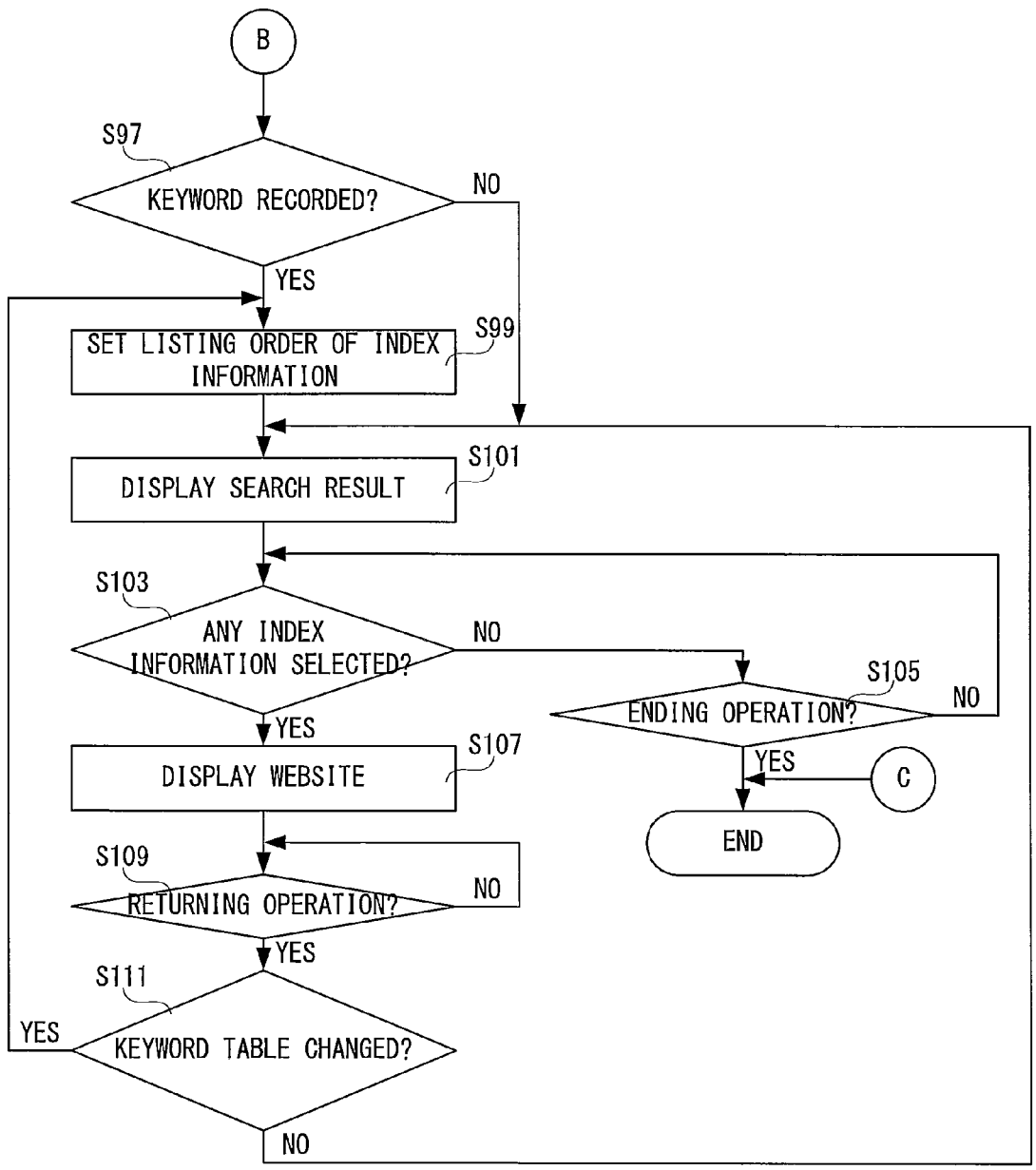
FIG. 16 is a flowchart showing another part of the browsing processing by the processor shown in FIG. 2, following FIG. 15.
Figure 17:
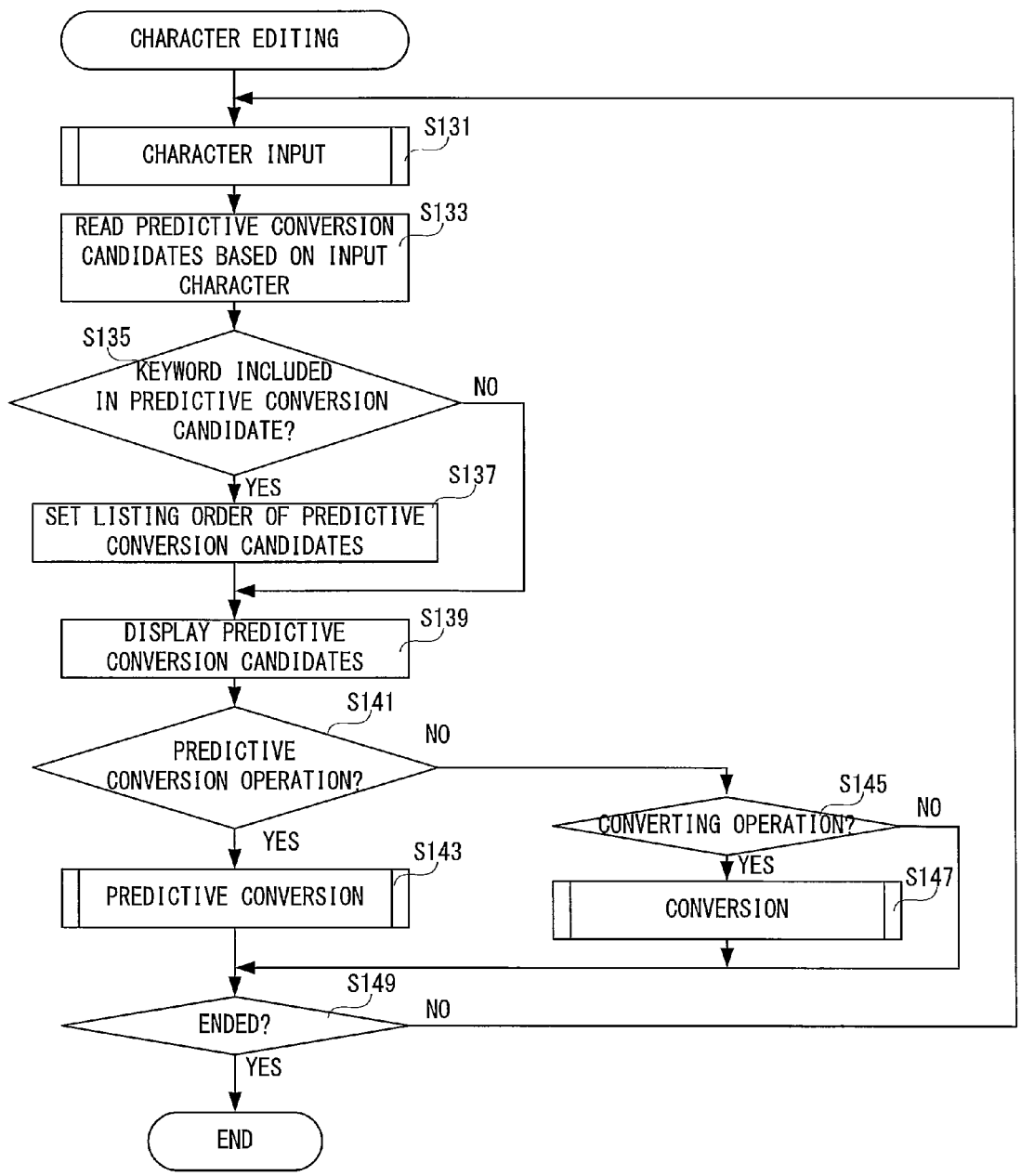
FIG. 17 is a flowchart showing an example of character editing phrase processing by the processor shown in FIG. 2.
Figure 18:
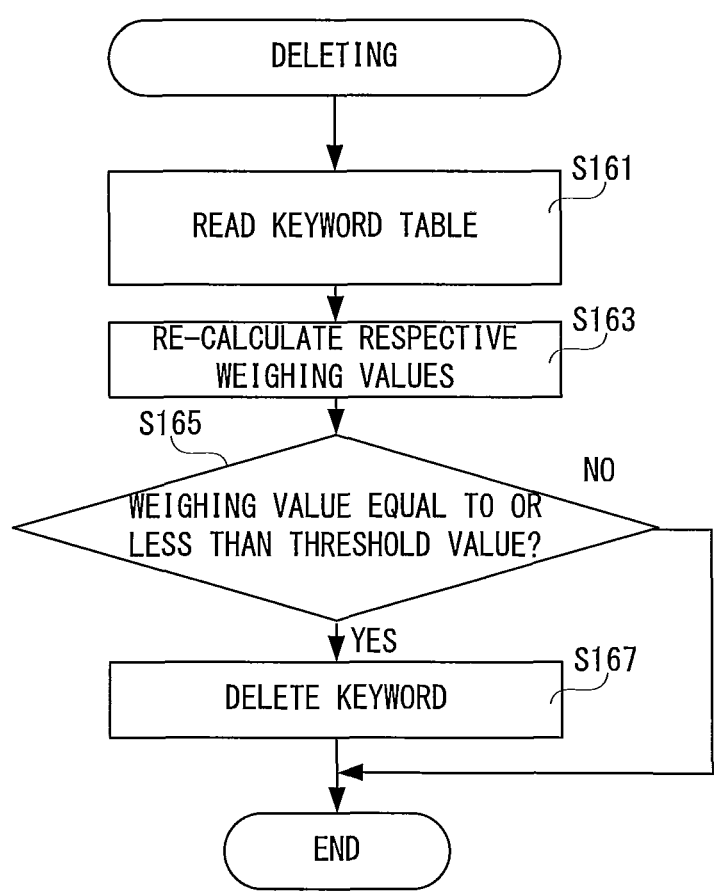
FIG. 18 is a flowchart showing an example of deleting processing by the processor shown in FIG. 2.

The processor 30 processes a plurality of tasks including recording processing shown in FIG. 12, keyword acquiring processing shown in FIG. 13, weighing value calculating processing shown in FIG. 14, browsing processing shown in FIGS. 15 and 16, character editing processing shown in FIG. 17, deleting processing shown in FIG. 18, etc., in parallel to each other under control by Linux (registered trademark)-basis OS such as Android (registered trademark), REX, etc. or other OS.

The recording processing is started if and when detecting processing of a line-of-sight is performed. In a step S1, the processor 30 determines whether or not a gaze point EP is detected. That is, it is determined whether or not a position a user gazes at is successfully detected. If "NO" is determined in the step S1, that is, if a gaze point EP is not detected, the process proceeds to a step S5. On the other hand, if "YES" is determined in the step S1, that is, if a gaze point EP is detected, the processor 30 records, in a step S3, a line-of-sight coordinates of the gaze point EP. More specifically, a time output by the RTC 30a and the line-of-sight coordinates of the gaze point EP being detected are stored in the line-of-sight locus buffer 332 in correspondence to each other.

Subsequently, the processor 30 determines whether or not the processing is to be ended in the step S5. That is, the processor 30 determines whether or not the line-of-sight detecting processing is ended. If "NO" is determined in the step S5, that is, if the line-of-sight detecting processing is not ended, the process returns to the step S1. On the other hand, if "YES" is determined in the step S5, that is, if an operation for ending the line-of-sight detecting processing is performed, for example, the processor 30 terminates the recording processing.

FIG. 13 is a flowchart of the keyword acquiring processing. If an operation for reading a website based on a search result or an operation for displaying a receiving mail is performed by the user, for example, the keyword acquiring processing is started. In a step S11, the processor 30 performs dividing processing. That is, the text is divided into words, and a gaze range is set for each word. In a case where an image is displayed, a displaying range of the image becomes a gaze range.

Subsequently, in a step S13, the processor 30 determines whether or not a line-of-sight locus is recorded. That is, the processor 30 determines whether or not the line-of-sight coordinates is recorded in the line-of-sight locus buffer 332 by the above-described recording processing. If "NO" is determined in the step S13, that is, if the line-of-sight is not detected, and thus, the line-of-sight coordinates is not recorded in the line-of-sight locus buffer 332, the processor 30 repeatedly performs the processing of the step S13.

If "YES" is determined in the step S13, that is, if the line-of-sight coordinates is recorded in the line-of-sight locus buffer 332, in a step S15, the processor 30 specifies a gaze range within which the gaze point EP is included. More specifically, the processor 30 reads a coordinates range representing a plurality of gaze ranges stored in the gaze range buffer 334, and then, specifies a coordinates range in which the line-of-sight coordinates of the newest gaze point EP stored in the line-of-sight locus buffer 332 are included.

Subsequently, in a step S17, the processor 30 determines whether or not the gaze range is gazed for more than a predetermined time period. That is, the processor 30 determines whether or not a time counted by the gaze counter 352 exceeds the predetermined time period. If "NO" is determined in the step S17, that is, if a time that the gaze range is gazed does not reach the predetermined time period, the process proceeds to a step S27.

If "YES" is determined in the step S17, that is, if the gaze range is gazed for more than a predetermined time period, the processor 30 determines, in a step S19, whether or not a character string is included in the gaze range. That is, the processor 30 determines whether or not a character string is displayed within the gaze range in which the gaze point EP is included. If "YES" is determined in the step S19, that is, if the gaze range includes a character string, the processor 30 acquires the character string within the gaze range as a keyword in a step S21. If "KEYWORD 1" is included in the gaze range, for example, "KEYWORD 1" is recorded in the keyword table 350. Then, if the processing of the step S21 is ended, the process proceeds to a step S27.

If "NO" is determined in the step S19, that is, if a character string is not included in the gaze range, in a step S23, the processor 30 determines whether or not an image is included in the gaze range. That is, the processor 30 determines whether or not an image is displayed within the gaze range in which the gaze point EP is included. If "NO" is determined in the step S23, that is, if an image is not included in the gaze range, the process proceeds to the step S27.

If "YES" is determined in the step S23, that is, if an image is included in the gaze range, in a step S25, the processor 30 acquires a fixed phrase ("image") as a keyword.

Subsequently, in a step S27, the processor 30 determines whether or not an ending operation is performed. That is, the processor 30 determines whether or not an operation for ending the reading of the website or the receiving mail is performed. If "NO" is determined in the step S27, that is, if no ending operation is performed, the process returns to the processing of the step S15.

If "YES" is determined in the step S27, that is, if an operation for ending the reading of the website, for example, in a step S29, the processor 30 performs the weighing value calculating processing. Then, if the processing in the step S29 is ended, the processor 30 terminates the keyword acquiring processing.

In addition, the keyword acquiring processing is also performed at a time that a website registered in advance by a bookmark is read.

In addition, the processor 30 performing the processing of the step S29 functions as a calculating module, and the processor 30 performs the processing of the step S21 or the step S25 functions as an acquiring module. Especially, the processor 30 performing the processing of the step S25 functions as a fixed phrase acquiring module.

FIG. 14 is a flowchart of the weighing value calculating processing. When the processing in the step S29 is performed in the keyword acquiring processing, in a step S51, the processor 30 acquires a line-of-sight locus. That is, the processor 30 reads the line-of-sight coordinates of a plurality of gaze points EP representing the line-of-sight locus.

Subsequently, in a step S53, the processor 30 evaluates the number of gaze times for each keyword based on the gaze range and the line-of-sight locus. In a case where a line-of-sight locus shown in FIG. 6(B) is read, for example, the number of gaze times of "KEYWORD 1" is evaluated as two times. Next, in a step S55, the processor 30 evaluates a gaze time period for each keyword based on the gaze range and the line-of-sight locus. In a case of the above-described "KEYWORD 1", for example, the gaze time period is evaluated as "1.0 second".

Then, in a step S57, the processor 30 calculates a weighing value based on the number of gaze times and the gaze time period. In a case where the number of gaze times is "two times" and the gaze time period is "1.0 second", for example, a weighing value is calculated as "32". Then, the number of gaze times, the gaze time period and the weighing value evaluated or calculated are stored in the weighing value buffer 336.

In addition, the processor 30 performing the processing of the step S53, the step S55 and the step S57 functions as an evaluating module. Especially, the processor 30 performing the processing of the step S53 functions as a gaze times evaluating module, and the processor 30 performing the processing of the step S55 functions as a gaze time period evaluating module.

Subsequently, the processor 30 records, in a step S59, the number of gaze times, the game time and the weighing value in correspondence to the keyword. For example, in a case of "KEYWORD 1", the number of gaze times, the game time and the weighing value are respectively recorded in the keyword table 350 as "two times", "1.0 second" and "32". Then, if the processing in the step S59 is ended, the processor 30 terminates the weighing value calculating process and the process returns to the keyword acquiring processing.

FIG. 15 is a flowchart of the browsing processing. If a browsing function is performed and an operation for accessing a top page of a search site is performed, in a step S81, the processor 30 displays the top page of the search site. A top page as shown in FIG. 4(A), for example, is displayed on the display 14.

Subsequently, in a step S83, the processor 30 determines whether or not a keyword is registered. That is, the processor 30 reads the keyword table 350 and determines whether or not the keyword is recorded in the table. If "NO" is determined in the step S83, that is, if no keyword is recorded in the keyword table 350, the process proceeds to a step S91.

If "YES" is determined in the step S83, that is, if the keyword is recorded in the keyword table 350, in a step S85, the processor 30 reads a predicted search word based on the keyword. That is, the processor 30 establishes a data communication with the server 102 and reads from the server 102 a predicted search word including the keyword. The predicted search word read is recorded in the communication buffer 338.

Subsequently, in a step S87, the processor 30 sets a listing order of the predicted search words. In a case where a plurality of keywords are recorded as shown in FIG. 7, for example, a listing order of a plurality of predicted search words is set such that a predicted search word including a keyword having a heavier weighing value becomes in a higher rank. Then, the processor 30 displays the predicted search words in a step S89. For example, the predicted search words in a set listing order are displayed in a top page of the search site as shown in FIG. 10(A).

Subsequently, the processor 30 determines whether or not a search operation is performed in a step S91. That is, it is determined whether or not a search word is input and an operation for starting the search is performed. If "NO" is determined in the step S91, that is, if no search operation is performed, in a step S93, the processor 30 determines whether or not it is an ending operation. That is, it is determined whether or not an operation for ending the browsing processing is performed. If "YES" is determined in the step S93, that is, if the ending operation is performed, the processor 30 terminates the browsing processing. If "NO" is determined in the step S93, that is, if no ending operation is performed, the process returns to the processing in the step S91.

If "YES" is determined in the step S91, that is, if an operation for starting the search is performed after the search word is input as shown in FIG. 4(A), for example, the processor 30 reads index information based on the search word in a step S95. That is, the index information corresponding to a website of a content related to the search word is read from the server 102. The index information read is stored in the communication buffer 338.

Subsequently, in a step S97, as similar to the step S83, the processor 30 determines whether or not a keyword is recorded. If "NO" is determined in the step S97, that is, if no keyword is recorded, the process proceeds to a step S101. If "YES" is determined in the step S97, that is, if a keyword is recorded, in a step S99, the processor 30 sets a listing order of the index information. In a case where a plurality of keywords are recorded, for example, a listing order is set such that index information including a content related to a keyword having a heavier weighing value becomes in a higher rank. Furthermore, in a case where the keyword is a fixed phrase ("image"), a listing order is set such that the index information indicative of a website including an image becomes a higher rank. Next, the processor 30 displays a search result in a step S101. For example, in accordance with a listing order set in the step S99, a screen of a search result including a plurality of index information is displayed as shown in FIG. 8. In addition, in a case where a listing order is not set in the step S99, a plurality of index information are displayed in a listing order set by the server 102.

Subsequently, in a step S103, the processor 30 determines whether or not any index information is selected. That is, the processor 30 determines whether or not an operation for selecting the index information being displayed on the display 14 is performed. If "NO" is determined in the step S103, that is, if the operation for selecting the index information is not performed, in a step S105, as similar to the step S93, the processor 30 determines whether or not it is an ending operation. If "YES" is determined in the step S105, that is, if the ending operation is performed, the processor 30 terminates the browsing processing. On the other hand, if "NO" is determined in the step S105, that is, the ending operation is not performed, the process returns to the processing of the step S103.

Furthermore, if "YES" is determined in the step S103, that is, if an operation for selecting any index information is performed, in a step S107, the processor 30 displays a website on the display 14. That is, a screen of a website corresponding to selected index information is displayed on the display 14. Subsequently, in a step S109, the processor 30 determines whether or not a returning operation is performed. That is, it is determined whether or not an operation for returning to a screen of the search result is performed. If "NO" is determined in the step S109, that is, the returning operation is not performed, the processor 30 repeatedly performs the step S109.

If "YES" is determined in the step S109, that is, if an operation for returning to the screen of the search result is performed, in a step S111, the processor 30 determines whether or not the keyword table 350 is changed. For example, it is determined whether or not a new keyword is added into the keyword table 350. If "YES" is determined in the step S111, that is, if a keyword is added, for example, the process returns to the processing in the step S99. If "NO" is determined in the step S111, that is, if no keyword is added, the process returns to the processing in the step S101.

In addition, the processor 30 performing the processing of the step S89 or the step S101 functions as a displaying processing module.

FIG. 17 is a flowchart of the character editing processing. For example, if a scheduling function or the like is performed, and thus, a state is rendered to a state capable of inputting a document or a word, the character editing processing is started. The processor 30 performs character inputting processing in a step S131. If the character inputting processing is performed, a virtual keyboard is displayed on the display 14 such that a state is rendered to a state capable of inputting a character string.

If a character is input, the character inputting processing is ended, and then, in a step S133, the processor 30 reads a predicted conversion candidate based on an input character. In a case where "" is input as shown in FIG. 10(B), for example, predicted conversion candidates "", " station" and "//" are read. Next, the processor 30 determines, in a step S135, whether or not a keyword is included in the predicted conversion candidates. In a case where " station" is recorded as a keyword, for example, it is determined whether or not there is a predicted conversion candidate including " station" in the read predicted conversion candidates.

If "NO" is determined in the step S135, that is, if a keyword is not recorded in the keyword table 350, for example, the process proceeds to a step S139. If "YES" is determined in the step S135, that is, if the predicted conversion candidate including the keyword is read, in a step S137, the processor 30 sets a listing order of the predicted conversion candidates. In a case where there are predicted conversion candidates respectively corresponding to a plurality of keywords, for example, a listing order of the predicted conversion candidates is set based on weighing values. If there is only a predicted conversion candidate corresponding to a single keyword, a listing order is set such that the predicted conversion candidate corresponding to the keyword becomes in a higher rank. Next, the processor 30 displays the predicted conversion candidates in a step S139. The predicted conversion candidates are displayed on the display 14 in accordance with a set listing order as shown in FIG. 10(B). In addition, the processor 30 performing the processing of the step S139 functions as a displaying processing module.

Subsequently, the processor 30 determines whether or not a predicted conversion operation is performed in a step S141. That is, it is determined whether or not an operation for starting a selection of the predicted conversion candidates being displayed is performed. If "YES" is determined in the step S141, that is, the predicted conversion operation is performed, the processor 30 performs the predicted conversion processing in a step S143. That is, the predicted conversion candidates are rendered selectable, and when an arbitrary predicted conversion candidate is selected, a character string which is being input is replaced with the predicted conversion candidate. Then, if the processing of the step S143 is ended, the process proceeds to a step S149.

If "NO" is determined in the step S141, that is, if the predicted conversion operation is not performed, in a step S145, the processor 30 determines whether or not a conversion operation is performed. That is, the processor 30 determines whether or not an operation for converting an input character is performed. If "NO" is determined in the step S145, that is, if the conversion operation is not performed, the process proceeds to the step S149.

If "YES" is determined in the step S145, that is, if the conversion operation is performed, in a step S147, the processor 30 performs converting processing. For example, a conversion candidate corresponding to a character string which is being input is displayed on the display 14. At this time, in a case where there is a conversion candidate including a keyword, as similar to the above-described predicted conversion candidate, the conversion candidate including the keyword is displayed on the display 14 at a higher rank.

Subsequently, in the step S149, it is determined whether or not the processing is to be ended. For example, the processor 30 determines whether or not an operation for ending a character input is performed. If "NO" is determined in the step S149, that is, if not to be ended, the process returns to the processing in the step S131. If "YES" is determined in the step S149, that is, if to be ended, the processor 30 terminates the character editing processing.

FIG. 18 is a flowchart of the deleting processing. If the predetermined time timer expires, for example, the deleting processing is started. In a step S161, the processor 30 reads the keyword table 350. Next, each weighing value is re-calculated in a step S163. That is, based on the above-described equation 2, each weighing value is re-calculated. In addition, the processor 30 performing the processing of the step S163 functions as a re-calculating module.

Next, in a step S165, it is determined whether or not the weighing value is equal to or less than a threshold value. That is, it is determined whether or not a weighing value equal to or less than the threshold value is recorded in the keyword table 350. If "YES" is determined in the step S165, that is, if the weighing value equal to or less than the threshold value is recorded, in a step S167, the processor 30 deletes the keyword. That is, a keyword corresponding to a weighing value equal to or less than the threshold value is deleted from the keyword table 350. In addition, the processor 30 performing the processing of the step S167 functions as a deleting module.

If "NO" is determined in the step S165, that is, a weighing value equal to or less than the threshold value is not recorded, the processor 30 terminates the deleting processing.

In addition, in a case where an acquired keyword is duplicated, duplicated keywords are integrated after weighing values are calculated. More specifically, sums of the number of gaze times, the gaze time period and the weighing values independently evaluated are calculated, and such sums are brought in relation to a single keyword. Furthermore, in a case where a newly acquired keyword has been registered, the newly acquired keyword and the registered keyword are also integrated into one.

Furthermore, in general, a size of the pupil is changed by not only a brightness of a surround environment but also a degree of interest of a user himself/herself. Therefore, in the other embodiments, a change of the size of the pupil may be utilized for calculation of the weighing value.

Furthermore, a weighing value may be calculated by an equation having structure different from structure of the above-described equation 1. Furthermore, the re-calculation of the weighing value may be performed by an equation having structure different from structure of the above-described equation 2.

Furthermore, in a case where a detection of the line-of-sight is successful, an icon indicating such a state may be displayed on the status displaying area 70.

Furthermore, in other embodiments, the mobile phone 10, the network 100 and the server 102 may be collectively called as an information search system.

Programs utilized in the above-described embodiments may be stored in an HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case that the plurality of programs downloaded via the above-described server or storage medium are installed to a communication terminal having the structure equal to the structure of the embodiment, it is possible to obtain advantages equal to advantages according to the embodiment.

The specific numerical values mentioned in this specification are only examples, and changeable properly in accordance with the change of product specifications.

An embodiment is an information terminal having a display portion displaying a text, and capable of reading any data from a database, comprising: a line-of-sight detecting module operable to detect a line-of-sight with respect to the display portion; an acquiring module operable to acquire a keyword from the text being displayed on the display portion based on a line-of-sight detected by the line-of-sight detecting module; and a displaying processing module operable to cause the display portion to display a plurality of data in a listing order set based on the keyword when the plurality of data are read from the database.

In the embodiment, the information terminal (10: reference numeral exemplifying a module corresponding in the embodiment, and so forth.) can read out arbitrary data from the database. The text displayed on the display portion (14) includes a document, a mail body or the like indicative of a content of a website. The line-of-sight detecting module (30, 24a, 24b) detects a line-of-sight at a time that the user is gazing at the display portion with utilizing an infrared ray. The acquiring module (30, S21, S25) acquires, based on the line-of-sight of the user, a keyword assumed that the user has interest from the text being displayed. The displaying processing module (30, S89, S101, S139) displays a plurality of data in a listing order that data related to the keyword becomes a higher rank when the plurality of data are read from the database.

According to the embodiment, a keyword is acquired by utilizing a line-of-sight of a user, and data being displayed are suitably rearranged by utilizing the keyword. Accordingly, it is possible for the user to efficiently search information.

Another embodiment is an information terminal, wherein the acquiring module acquires a plurality of keywords, further comprising a calculating module operable to calculate respective weighing values of the plurality of keywords based on the line-of-sight detected by the line-of-sight detecting module, wherein the displaying processing module causes the display portion to display the plurality of data in a listing order set based on the respective weighing values of the plurality of keywords.

In this embodiment, in a case that the user gazes at a plurality of keywords, the plurality keywords are acquired. The calculating module (30, S29, S53, S55, S57) calculates a weighing value that indicates height of interest of a user in each keyword as a numeral value based on the line-of-sight of the user. Then, the displaying processing module causes the display portion to display the plurality of data in a listing order that the data related to the keyword having a heavier weighing value becomes a higher rank.

According to this embodiment, even if the number of the keyword is two or more, it is possible to adequately set a listing order of the plurality of data by calculating the weighing values of the respective keywords.

Still another embodiment is an information terminal, wherein the calculating module further includes a gaze times evaluating module operable to evaluate, based on the line-of-sight detected, the number of times that the keyword is gazed, and the calculating module calculates each weighing value of each of the plurality of keywords based on the number of times evaluated by the gaze times evaluating module.

In this embodiment, the gaze times evaluating module (30, S53) evaluates the number of times that the keyword is gazed, for more than a predetermined time period by utilizing a locus of the line-of-sight of the user, for example. Then, the weighing value is calculated based on the number of times that the keyword is gazed.

Yet another embodiment is an information terminal, wherein the calculating module further includes a gaze time period evaluating module operable to evaluate, based on the line-of-sight detected, a time that the keyword is gazed, and the calculating module calculates each weighing value of each of the plurality of keywords based on the time evaluated by the gaze time period evaluating module.

In this embodiment, the gaze time period evaluating module (30, S55) evaluates a time from a time that the keyword has been gazed for more than a predetermined time period as the gaze time period by utilizing a locus of the line-of-sight of the user, for example. Then, the weighing value is calculated based on the time that the keyword is gazed.

According to these two embodiments, it is possible to calculate a height or level of interest of the user in the keyword as the weighing value based on the times or the time that the user gazes at the keyword.

A further embodiment is an information terminal, further comprising a re-calculating module operable to calculate again the respective weighing value such that the respective weighing values of the plurality of keywords are decreased; and a deleting module operable to delete a keyword when the weighing value corresponding to the keyword, which is re-calculated by the re-calculating module, is equal to or less than a threshold value.

In the further embodiment, the re-calculating module (30, S163) re-calculates the weighing value set to the keyword by utilizing a time that the keyword is acquired. The deleting module (30, S167) deletes a keyword when the corresponding weighing value becomes equal to or less than a threshold value through re-calculation.

According to the further embodiment, it is possible to delete that keyword assumed that the user loses the interest.

A still further embodiment is an information terminal, wherein the display portion further displays an image, and the acquiring module includes a fixed phrase acquiring module operable to acquire a fixed phrase as a keyword when the line-of-sight detected by the line-of-sight detecting module is included within a displaying range of the image, and the displaying processing module causes the display portion to display a plurality of data in a listing order set such that the data including an image becomes a higher rank out of the plurality of data read, when the fixed phrase is a keyword.

In the still further embodiment, on the display portion, an image is displayed in addition to the text. The fixed phrase acquiring module (30, S25) acquires a fixed phrase ("image") as a keyword in a case where the user gazes the image. Then, if the fixed phrase is a keyword, the plurality of data are displayed in the listing order set such that the data including an image becomes a higher rank.

According to the still further embodiment, if the user gazes at the image, a listing order that data including an image becomes a higher rank can be set.

A yet further embodiment is an information terminal, wherein the plurality of data read from the database include a plurality of index information read based on a search word, and the displaying processing module causes the displaying portion to display the plurality of index information in a listing order set based on the keyword when the plurality of index information are read.

In the yet further embodiment, the index information is information utilized in performing data search. The index information are read from the database if and when the search processing utilizing a search word is performed. The read index information are displayed in a listing order set based on the keyword.

According to the yet further embodiment, it is possible to re-arrange the index information by utilizing the keyword in which the user is interested. Accordingly, it becomes possible for the user to efficiently find the index information of the data including target information.

A yet still further embodiment is an information terminal, wherein the plurality of data read from a database include a plurality of predicted search words, and the displaying processing module causes the displaying portion to display the plurality of predicted search words in a listing order set based on the keyword when the plurality of predicted search words are read.

In the yet still further embodiment, the predicted search words are displayed in a search screen to assist an input of a search word. Then, the read predicted search words are displayed in the listing order that is set based on the keyword.

According to the yet still further embodiment, because the keyword is used at a time that the search is started, convenience for the user who searches the information increases.

Another embodiment is an information terminal, wherein the plurality of data read from the database include a plurality of conversion candidates corresponding to an input character, and the displaying processing module causes the displaying portion to display the plurality of conversion candidates in a listing order set based on the keyword when the plurality of conversion candidates are read.

In the embodiment, if the character is input, the plurality of conversion candidates are read, which are displayed in a listing order that the conversion candidate related to the keyword becomes a higher rank.

According to the embodiment, an efficiency of the character input by the user increases since it is possible to display at a higher rank the predicted conversion candidate conceivable to be input by the user who inputs a character.

A further embodiment is an information terminal, wherein the database is stored in a server.

In this embodiment, the plurality of data are read from the server (102).

According to the further embodiment, it becomes possible for the user to search necessary information from the database stored in the server.

The other embodiment is a display controlling method in an information terminal (10) having a display portion (14) displaying a text and a line-of-sight detecting module (24a, 24b) operable to detect a line-of-sight with respect to the display portion, the information terminal is capable of reading any data from a database, comprising steps of: acquiring a keyword from the text being displayed on the display portion based on a line-of-sight detected by the line-of-sight detecting module (S21, S25); and displaying on the display portion a plurality of data in a listing order set based on the keyword when the plurality of data are read from the database (S89, S101, S139).

According to the other embodiment, a keyword is acquired by utilizing a line-of-sight of a user, and data being displayed are adequately rearranged by utilizing the keyword. Accordingly, it is possible for the user to efficiently search information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information terminal having a display portion displaying information comprising one or more of text and an image, the information terminal comprising:
    at least one processor that
        detects a plurality of line-of-sights between a user and the display portion, and determines a gaze point of the user on the display portion based on each of the plurality of line-of-sights;
        determines a plurality of keywords, at locations within the information being displayed on the display portion, that correspond to locations of the determined gaze points, wherein a fixed phrase is determined as the keyword when a determined gaze point is included within a displaying range of an image;
        for each of the plurality of keywords, determines a number of times that the keyword is gazed upon, and calculates a weighing value for the keyword based on the number of times that the keyword is gazed upon; and,
        when search results are to be listed on the display portion, determines an order of the search results based on the respective weighing values of the plurality of keywords, and causes the display portion to list the search results in the order,
        wherein one or more of the search results including an image is ordered higher than one or more of the search results not including an image when a determined gaze point is included within a displaying range of an image.

2. The information terminal according to claim 1, wherein the search results comprise a plurality of index information retrieved based on a search word.

3. The information terminal according to claim 2, wherein the search word is different than the plurality of keyword.

4. The information terminal according to claim 2, wherein each of the plurality of index information is associated with data, and wherein determining an order of the search results comprises ordering one or more of the plurality of indexes that are associated with data that includes at least one of the plurality of keywords higher than one or more of the plurality of indexes that are associated with data that does not include at least one of the plurality of keywords.

5. The information terminal according to claim 1, wherein the search results comprise a plurality of predicted words.

6. The information terminal according to claim 5, wherein determining an order of the search results comprises ordering one or more of the plurality of predicted words that include at least one of the plurality of keyword higher than one or more of the plurality of predicted words that do not include at least one of the plurality of keywords.

7. The information terminal according to claim 1, wherein the search results comprise a plurality of conversion candidates corresponding to one or more input characters.

8. The information terminal according to claim 7, wherein determining an order of the search results comprises ordering one or more of the plurality of conversion candidates that include at least one of the plurality of keywords higher than one or more of the plurality of conversion candidates that do not include at least one of the plurality of keywords.

9. The information terminal according to claim 1, wherein the search results are retrieved from a database, and the database is stored in a server.

10. The information terminal according to claim 1, wherein the at least one processor determines each keyword when a time period that the gaze point remains at the location corresponding to the location of the keyword exceeds a predetermined time period.

11. An information terminal having a display portion displaying information comprising one or more of text and an image, the information terminal comprising:
    at least one processor that
        detects a plurality of line-of-sights between a user and the display portion, and determines a gaze point of the user on the display portion based on each of the plurality of line-of-sights;
        determines a plurality of keywords, at locations within the information being displayed on the display portion, that correspond to locations of the determined gaze points, wherein a fixed phrase is determined as the keyword when a determined gaze point is included within a displaying range of an image;
        for each of the plurality of keywords, determines a time that the keyword is gazed upon, and calculates a weighing value for the keyword based on the time that the keyword is gazed upon; and,
        when search results are to be listed on the display portion, determines an order of the search results based on the respective weighing values of the plurality of keywords, and causes the display portion to list the search results in the order,
        wherein one or more of the search results including an image is ordered higher than one or more of the search results not including an image when a determined gaze point is included within a displaying range of an image.

12. The information terminal according to claim 11, further comprising a memory, wherein the at least one processor further:
    for each of the plurality of keywords, stores the keyword in association with its weighting value in the memory;
    after a predetermined amount of time has passed, re-calculates the respective weighing value of each of the plurality of keywords such that the respective weighing values of the plurality of keywords decrease over time; and
    deletes a keyword from the memory when the weighing value corresponding to the keyword becomes equal to or less than a threshold value.

13. A display controlling method in an information terminal having a display portion displaying information comprising one or more of text and an image, wherein the method comprises:
    detecting a plurality of line-of-sights between a user and the display portion;

determining a gaze point of the user on the display portion based on each of the plurality of line-of-sights;

determining a plurality of keywords, at locations within the information being displayed on the display portion, that correspond to locations of the determined gaze points, wherein a fixed phrase is determined as the keyword when a determined gaze point is included within a displaying range of an image;

for each of the plurality of keywords, determining a number of times that the keyword is gazed upon, and calculating a weighing value for the keyword based on the number of times that the keyword is gazed upon; and, when search results are to be listed on the display portion, determining an order of the search results based on the respective weighing values of the plurality of keywords, and causing the display portion to list the search results in the order, wherein one or more of the search results including an image is ordered higher than one or more of the search results not including an image when a determined gaze point is included within a displaying range of an image.

* * * * *